(12) United States Patent
Tsai

(10) Patent No.: US 12,252,238 B2
(45) Date of Patent: Mar. 18, 2025

(54) MACHINE AND PROCESS FOR ACTIVATION OF FLOW CONTROL DEVICE

(71) Applicant: The Boeing Company, Arlington, VA (US)

(72) Inventor: Kevin Raylin Tsai, Redmond, WA (US)

(73) Assignee: The Boeing Company, Arlington, VA (US)

( * ) Notice: Subject to any disclaimer, the term of this patent is extended or adjusted under 35 U.S.C. 154(b) by 129 days.

(21) Appl. No.: 18/177,310

(22) Filed: Mar. 2, 2023

(65) Prior Publication Data
US 2024/0294249 A1   Sep. 5, 2024

(51) Int. Cl.
*B64C 21/08*   (2023.01)
*B64C 9/02*   (2006.01)
*B64C 9/04*   (2006.01)
*B64F 5/10*   (2017.01)

(52) U.S. Cl.
CPC ............. *B64C 21/08* (2013.01); *B64C 9/02* (2013.01); *B64C 9/04* (2013.01); *B64F 5/10* (2017.01)

(58) Field of Classification Search
CPC ............. B64C 21/08; B64C 9/02; B64C 9/04
See application file for complete search history.

(56) References Cited

U.S. PATENT DOCUMENTS

| 1,917,428 | A | * | 7/1933 | Burnelli | B64C 9/28 244/214 |
| 3,583,660 | A | * | 6/1971 | Hurkamp | B64C 21/04 244/212 |
| 4,471,928 | A | * | 9/1984 | Cole | B64C 9/20 244/215 |
| 4,725,026 | A | * | 2/1988 | Krafka | B64C 9/16 244/215 |
| 5,836,550 | A | * | 11/1998 | Paez | B64C 9/22 244/214 |
| 7,367,530 | B2 | | 5/2008 | Harrigan et al. | |
| 8,712,606 | B2 | | 4/2014 | Beaufrere | |
| 9,415,860 | B2 | | 8/2016 | Beaufrere | |
| 10,889,365 | B2 | * | 1/2021 | Bowers | B64C 9/02 |
| 2012/0012696 | A1 | * | 1/2012 | Sakurai | B64C 9/16 244/99.3 |
| 2019/0233081 | A1 | * | 8/2019 | Budnitsky | B64C 9/16 |
| 2021/0101671 | A1 | * | 4/2021 | Tsai | B64C 9/02 |
| 2022/0073185 | A1 | * | 3/2022 | Abdel Nour | B64C 13/30 |

\* cited by examiner

*Primary Examiner* — Joshua J Michener
*Assistant Examiner* — Cindi M Curry
(74) *Attorney, Agent, or Firm* — Yee & Associates, P.C.

(57) ABSTRACT

A process and a machine for reducing a profile of a flap system including forming a track housing within a flap system including: a foil and a track housing within the foil, two track housing lugs extending out from an opening therein and beyond a leading edge of the foil, and a track that has a curved shape configured to: support the foil; and guide a movement of the foil along the track. The flap system may include an anchor plate and an actuator configured to connect to the foil, and a pylon that includes: a length and a depth enclosing a section of a dual channel portion of the track extending out an exit hole of the track housing in the foil. The process may continue by attaching the anchor plate and the pylon to a wing, and the actuator to the anchor plate.

20 Claims, 16 Drawing Sheets

1200

1202 — FORM A TRACK HOUSING WITHIN A FLAP SYSTEM THAT COMPRISES:
- A FOIL THAT COMPRISES: AN UPPER SURFACE, A LOWER SURFACE, A LEADING EDGE, A TRAILING EDGE, AN INBOARD EDGE, AN OUTBOARD EDGE, AND THE TRACK HOUSING WITHIN THE FOIL, WHEREIN THE TRACK HOUSING IS DEFINED BY:
  - THE UPPER SURFACE;
  - THE LOWER SURFACE;
  - AN OPENING AT THE LEADING EDGE THAT EXTENDS, TOWARD THE TRAILING EDGE, BETWEEN THE UPPER SURFACE AND THE LOWER SURFACE AND TERMINATES BEFORE THE TRAILING EDGE IN AN EXIT HOLE IN THE LOWER SURFACE;
- TWO TRACK HOUSING LUGS THAT EXTEND OUT FROM THE OPENING AND BEYOND THE LEADING EDGE;
- A FOIL CLEVIS THAT EXTENDS BELOW THE LOWER SURFACE;
- A TRACK THAT COMPRISES A BRACKET PORTION THAT COMPRISES A FORWARD END, A DUAL CHANNEL PORTION THAT COMPRISES AN AFT END, AND A CURVED SHAPE CONFIGURED TO:
  - SUPPORT THE FOIL; AND
  - GUIDE A MOVEMENT OF THE FOIL;
- AN ANCHOR PLATE THAT COMPRISES A TRACK LUG, TWO STRUT LUGS, AND AN ANCHOR CLEVIS THAT ALL EXTEND FROM A FOIL SIDE OF THE ANCHOR PLATE;
- AN ACTUATOR CONFIGURED TO CONNECT TO THE FOIL CLEVIS AND TO THE ANCHOR CLEVIS, AND TO EXTEND AND RETRACT THE FOIL; AND
- A PYLON THAT COMPRISES:
  - A LENGTH THAT EXTENDS, WITH THE ACTUATOR IN A FULLY RETRACTED POSITION, FROM A SPAR SIDE OF THE ANCHOR PLATE TO BEYOND THE TRAILING EDGE OF THE FOIL; AND
  - A DEPTH THAT ENCLOSES A SECTION OF THE DUAL CHANNEL PORTION OF THE TRACK THAT EXTENDS, WITH THE ACTUATOR IN A FULLY RETRACTED POSITION, OUT THE EXIT HOLE AND BENEATH THE LOWER SURFACE

1204 — ATTACH THE FOIL TO A WING BY: ATTACHING THE ANCHOR PLATE TO THE WING, ATTACHING THE FORWARD END OF THE TRACK TO THE TRACK LUG, ATTACHING A STRUT TO THE TWO STRUT LUGS AND TO THE BRACKET PORTION OF THE TRACK, AND ATTACHING THE ACTUATOR TO THE ANCHOR CLEVIS AND TO THE FOIL CLEVIS

1206 — COVER, WITH THE PYLON, THE ACTUATOR, THE FOIL CLEVIS, AND THE SECTION OF THE DUAL CHANNEL PORTION OF THE TRACK THAT EXTENDS, WITH THE ACTUATOR IN A FULLY RETRACTED POSITION, OUT THE EXIT HOLE AND BENEATH THE LOWER SURFACE

FIG. 12

MACHINE AND PROCESS FOR ACTIVATION OF FLOW CONTROL DEVICE

BACKGROUND INFORMATION

1. Field

The present disclosure relates generally to control of fluid flow over a surface. More particularly this disclosure illustrates a machine and process that enhance a lift and minimize a drag produced by a first foil that extends from a second foil and controls fluid flowing over the first foil and the second foil.

2. Background

Vehicle designers and operators face a constant challenge to create a process, machine, manufacture, and/or composition of matter that produce a technical effect that will reduce a cost and/or improve a performance, of a vehicle that moves through a fluid. Reference to a vehicle may indicate not only the vehicle as a whole, but may also indicate a particular part and/or parts of the vehicle. a fuel efficiency and/or a range of the vehicle. The vehicle may be without limitation, an aerospace vehicle, such as without limitation, an aircraft, an aquatic vehicle, and/or a vehicle that travels on terrain.

Without limitation, current aircraft control flow of air with wings, and augment the performance of the wings with various devices that include without limitation flaps. Current flap systems come in various configurations designed to increase the lift provided by airflow over the wing and flap combination. Transport size aircraft typically have several Fowler flaps that are extended by large actuating screws housed in large pylons attached underneath a wing of the aircraft. When extended to increase lift of the wing, the Fowler flaps also significantly increase drag produced by the wing/flap combination.

Current flap structures may carry large structural loads when producing lift. Hence, current flap structures require a strength to support the loads that may require dimensions and weight of the flap and/or flap actuation mechanism that are greater than desired for certain performance goals for the aircraft.

Additionally, as one of ordinary skill in the art appreciates, increasing a size/shape of a control surface of a vehicle moving through a fluid, such as without limitation a wing and/or flap of an aircraft, increases the profile drag produced by the control surface, such as without limitation a wing and/or flap of an aircraft. Further, for a given sized control surface, profile drag produced by the control surface increases as speed of the vehicle through the fluid is increased. Thus without limitation, for any given sized wing and/or flap, the profile drag produced will increase as an aircraft airspeed increases.

Even when current control surfaces may be fully retracted, pylons covering actuating mechanisms for the control surfaces also add a significant amount of profile drag to the vehicle. Thus without limitation, as aircraft speed increases the profile drag of the pylons increases. Hence, as the desired cruise speed for transport aircraft increases, so too does a need for flaps and a flap actuation system that do not produce significant amounts of drag when retracted in cruise flight.

Regulations, from various agencies around the globe, for certification of aircraft, particularly for aircraft used for commercial transport, may control performance requirements that may affect without limitation, at least a size, a shape, and a location of a flight control surface on an aircraft, and systems that control and/or actuate the flight control surface on the aircraft. A non-limiting example of such regulations in the United States may be found in the Federal Aviation Regulations (FARs), such as without limitation, FAR Part 25, and Federal Aviation Administration Advisory Circulars issued thereto.

Factors that determine an aerodynamic force on a wing and/or a flap of an aircraft may include without limitation: an airspeed of the aircraft, a profile (size and/or shape) of the wing and/or flap, an angle of attack of the wing and/or flap, and/or atmospheric conditions such as without limitation, air density. Currently, for subsonic transport aircraft wing thicknesses are used that produce drag values acceptable for subsonic speeds. Flaps and flap actuation systems on current subsonic aircraft are sized commensurate with the thickness of the current subsonic wing designs, and that produce drag values acceptable for subsonic speeds.

Both wing thickness and flap thicknesses and activation systems on current subsonic aircraft produce drag values that are too great to be acceptable at transonic speeds or higher. Accordingly, while reduced profile drag is desired for all wings and flap systems, as planned operational airspeeds increase for aircraft, there is a need for a technological improvement of devices that will generate desired lift values without generating unacceptable values of profile drag.

For a given control surface of a particular material, a larger size of the control surface will also increase the weight of the control surface. Increased weight of a vehicle tends to increase the vehicle's profile drag—particularly at higher airspeeds—and thus fuel consumption.

Hence, for current aircraft with a flap system configured for subsonic cruise flight, drag, weight, and resulting fuel economy for current aircraft all exist in technical deficiency for speeds approaching, at, and beyond a transonic range. In other words, large numbers of aircraft flying today, have flap system configurations with excessive drag and that carry an excessive amount of unproductive weight for speeds approaching, at, and beyond a transonic range. In other words, without incorporating an embodiment of a novel machine and/or process described herein, current aircraft may have an excessive amount of drag and unproductive weight from a horizontal stabilizer that is larger than would be required for those aircraft by an embodiment of the novel machine and/or process described herein.

Therefore, it would be desirable to have a process and machine that take into account at least some of the issues discussed above, as well as other possible issues. For example, it would be desirable to have a process and machine that overcome the technical deficiencies resulting from a current size flap system.

SUMMARY

Embodiments herein describe at least a machine that includes: a foil that includes an upper surface, a lower surface, a leading edge, a trailing edge, an inboard edge, an outboard edge, and a track housing within the foil. The track housing may be defined by: the upper surface; the lower surface; and an opening at the leading edge that extends, toward the trailing edge, between the upper surface and the lower surface and terminates before the trailing edge in an exit hole in the lower surface.

The machine may also include two track housing lugs that extend out from the opening and beyond the leading edge; a foil clevis that extends below the lower surface; a track that includes a forward end, and aft end, and a curved shape configured to support the foil and to guide a movement of the foil. The machine may also include an anchor plate that includes: a track lug, two strut lugs, and an anchor clevis that all extend from a foil side of the anchor plate; and an actuator connected to the foil clevis and to the anchor clevis.

The upper surface and the lower surface may have a shape configured to control a flow of a fluid passing over the foil. With the actuator in a fully retracted position, a section of the track may extend out the exit hole and below the lower surface.

The foil clevis may extend, just outboard of an outboard side of the track housing, below the lower surface. An inboard side within the track housing and an outboard side within the track housing each, respectively may include a roller mounted on a cantilever.

An interior of the track housing may include an inboard side and an outboard side, each that respectively comprise a roller configured to rotate within and support the track. The track may include a dual channel portion that may include an inboard channel and an outboard channel, each respectively configured to receive, to support, and to guide, rollers connected to the track housing.

Each of the two track housing lugs may retain, respectively, a roller configured to engage with a dual channel portion of the track. The track may include a bracket portion and a dual channel portion. The track may include a bracket portion that may include: a track clevis at the forward end of the track; and a set of strut pins.

The machine may further include a strut that may include: an anchor end and a track end; a first strut clevis at the track end of the strut and attached to a set of strut pins of the track; a second strut clevis at the anchor end of the strut; and a third strut clevis at the anchor end of the strut. The upper surface may include a slot that extends from the opening, above the track housing, and toward the trailing edge. The anchor plate may have a spar side configured to attach to a wing. The curved shape of the track may be configured to initially guide a movement of the foil away from the anchor plate parallel to a chord line of the wing to which the anchor plate may be attached.

The machine may also include a pylon that may include: a length that extends, with the actuator in a fully retracted position, from a spar side of the anchor plate to beyond the trailing edge of the foil; and a depth that encloses a section of the track that extends, with the actuator in a fully retracted position, out the exit hole and beneath the lower surface.

Another embodiment described herein may include a flap system that may include: a foil that may include an upper surface, a lower surface, a leading edge, a trailing edge, an inboard edge, an outboard edge, and a track housing within the foil. The track housing in the flap system may be defined by: the upper surface; the lower surface; and an opening at the leading edge that extends, toward the trailing edge, between the upper surface and the lower surface and terminates before the trailing edge in an exit hole in the lower surface.

The flap system may also include two track housing lugs that extend out from the opening and beyond the leading edge; a foil clevis that extends below the lower surface; and a track that may include a forward end, an aft end, and a curved shape configured to: support the foil; and guide a movement of the foil. The flap system may also include an anchor plate that may include a track lug, two strut lugs, and an anchor clevis that all extend from a foil side of the anchor plate; and an actuator connected to the foil clevis and to the anchor clevis.

The flap system may also include a pylon that may include: a length that may extend, with the actuator in a fully retracted position, from a spar side of the anchor plate to beyond the trailing edge of the foil; and a depth that encloses a section of track that may extend, with the actuator in a fully retracted position, out the exit hole and beneath the lower surface. The flap system may further include a strut connected to: the two strut lugs; and two pins that extend from a bracket portion of the track.

In the flap system, a width between the upper surface and the lower surface may be less than a thickness of a trailing edge of a wing to which the anchor plate may be configured to attach. The wing may be configured for transonic flight. The anchor plate may be configured to attach to a wing.

In the flap system, the curved shape of the track may be configured to initially guide a movement of the foil away from the anchor plate parallel to a chord line of the wing to which the anchor plate may be attached. Each of the track housing lugs may retain a roller, respectively, configured to rotate within a track channel of the track.

Another embodiment described herein may include process for forming a flap system. The process for forming the flap system may include forming a track housing within a flap system that may include: a foil that may include an upper surface, a lower surface, a leading edge, a trailing edge, an inboard edge, an outboard edge, and the track housing within the foil, wherein the track housing may be defined by: the upper surface; the lower surface; an opening at the leading edge that extends, toward the trailing edge, between the upper surface and the lower surface and terminates before the trailing edge in an exit hole in the lower surface; two track housing lugs that extend out from the opening and beyond the leading edge; a foil clevis that extends below the lower surface; a track that may include a bracket portion that may include a forward end, a dual channel portion that may include an aft end, and a curved shape configured to: support the foil; and guide a movement of the foil; an anchor plate that may include a track lug, two strut lugs, and an anchor clevis that all extend from a foil side of the anchor plate; an actuator configured to connect to the foil clevis and to the anchor clevis, and to extend and retract the foil; and a pylon that may include: a length that extends, with the actuator in a fully retracted position, from a spar side of the anchor plate to beyond the trailing edge of the foil; and a depth that encloses a section of the dual channel portion of the track that extends, with the actuator in a fully retracted position, out the exit hole and beneath the lower surface.

A further step in forming the flap system may include attaching the foil to a wing by attaching the anchor plate to the wing, attaching the forward end of the track to the track lug, attaching a strut to the two strut lugs and to the bracket portion of the track, and attaching the actuator to the anchor clevis and to the foil clevis. Forming the flap system may also include covering, with the pylon, the actuator, the foil clevis, and the section of the dual channel portion of the track that extends, with the actuator in a fully retracted position, out the exit hole and beneath the lower surface.

BRIEF DESCRIPTION OF THE DRAWINGS

Features believed novel and/or characteristic of the illustrative embodiments are recited in the appended claims. Understanding of the illustrative embodiments, as well as a preferred mode of use, further objectives and features thereof, will be enhanced by reference to the following detailed description of illustrative embodiments of the present disclosure when read in conjunction with the accompanying drawings, wherein:

FIG. 12 is an illustration of a flowchart of a process for forming a flap system, depicted in accordance with an illustrative embodiment;

DETAILED DESCRIPTION

Figure 1:
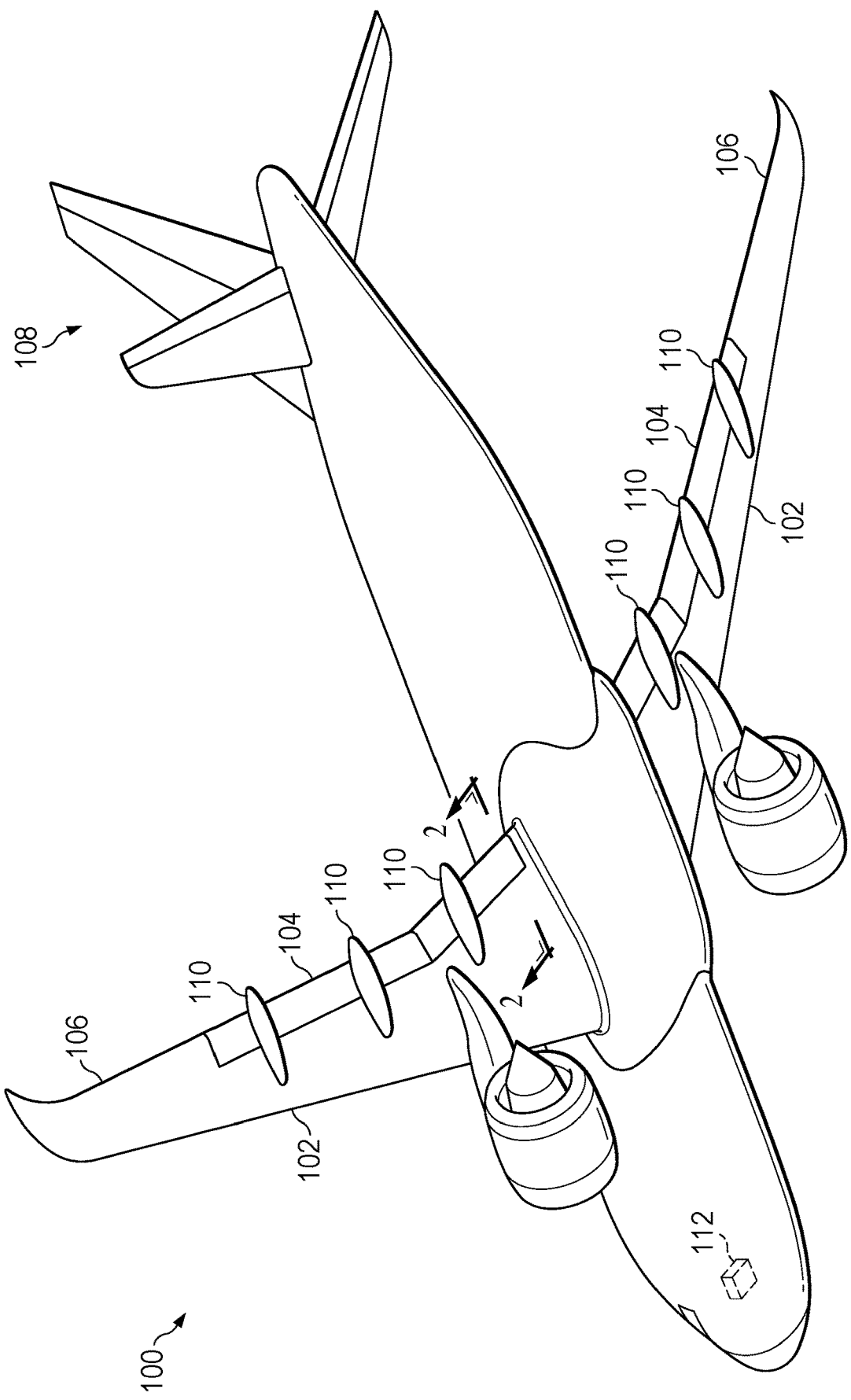
FIG. 1 is an illustration of a perspective view of an aircraft with a flap, depicted in accordance with an illustrative embodiment.

The illustrative embodiments recognize and take into account one or more different considerations. A vehicle in motion through a fluid may have surfaces configured to control a flow of the fluid over and/or around the vehicle in a manner that generates forces that control a motion of the vehicle. Aircraft components may produce lift and drag. As a non-limiting example, the illustrative embodiments recognize and take into account that reducing a value of aerodynamic drag (drag for short) for any component of an aircraft may increase the fuel efficiency of the aircraft. A lift producing component may produce an induced drag due to lift production and a profile drag due to the profile (also known as a shape, a size, or a form) of the component. Generally, the amount of profile drag a component produces increases as the airspeed of the aircraft increases. Therefore, to lower profile drag contributed by a component of the aircraft it may be desirable to reduce a size of a component, such as without limitation a wing and/or flap of the aircraft.

Without limitation, reducing a cost can include reducing a cost to manufacture, maintain, retrofit, and/or operate the vehicle. Without limitation, improving the performance of the vehicle can include an improvement in at least maneuverability, stability, responsiveness, efficiency, and/or an increase in reliability for the vehicle and/or a component thereof. Without limitation, improving the efficiency of the vehicle may include reducing a weight and/or a drag of the vehicle, and/or improving To reduce profile drag for aircraft designed to fly at higher airspeeds such as without limitation, transonic speeds, it is desirable to reduce a thickness of the wing. Currently, reduction in wing thickness may be limited by a size of flap needed to provide adequate takeoff and landing performance for an aircraft, particularly for large transport aircraft.

Reducing a size of an aircraft component may also reduce a weight of the component and thus reduce a weight of the aircraft. Reducing the weight of the aircraft may increase the fuel efficiency of the aircraft. Thus, it may be desirable, for any particular aircraft model to reduce a size and/or weight of a wing and/or flap system, and thereby reduce the drag and increase fuel efficiency of the aircraft. As used herein, a particular aircraft model may refer to a particular aircraft type, such as without limitation a B777, or to a particular series of a type aircraft, such as without limitation B777-300, or to a generation of an aircraft design, such as without limitation, the B737 MAX.

The illustrative embodiments also recognize and take into considerations, that sizing requirements for a flap system may be impacted at least by a size of a wing and an expected operating speed of an aircraft. The requirements may be driven by an airspeed near, at, or above a transonic region. Thus, at least as explained herein, a size and/or shape (also known as form or profile) as well as the weight of a flap system may create technical inefficiencies at least of increased drag and fuel consumption of the aircraft in flight, and particularly so at higher airspeeds.

Additionally, the illustrative embodiments recognize and take into account that fly-by wire control systems using buses, such as those used in computers, are becoming more common in aircraft. For example, special flight control programs in a computer processor may send commands to special actuator control programs in processors that control devices in the aircraft. Actuator control programs may control, for example, a flight control surface, an engine, or some other suitable device in the aircraft that may affect a change a lift and/or a drag of an aircraft.

Thus, embodiments illustrated herein improve a process, machine, manufacture, and/or composition of matter for controlling a lift and/or a drag for an aircraft and/or a flap system thereon provide the technical effect of improving responsiveness, efficiency, and/or reliability for the vehicle. Moreover, the illustrative embodiments provide a method and apparatus for controlling flight control surfaces and thus a lift and a drag on an aircraft. Such methods and apparatus may include a data bus system, and actuator control programs and/or flight control programs specially programmed in processors. A data bus system may be located in an aircraft. The actuator control programs may be in communication with the data bus system.

An actuator control program may control positioning of a group of flight control surfaces on the aircraft using commands on the data bus system that are directed to the actuator control program. Control of flight control actuators may be commanded by a flight control system that may contain flight control programs that may be connected to the data bus system.

The flight control programs may generate and send the commands onto the bus system to control the flight control surfaces on the aircraft. The commands for a flight control surface may be directed towards a group of actuator control programs on processors assigned to the actuators of the flight control surfaces.

A "group of," as used herein with reference to items, means one or more items. For example, a "group of actuator control modules" is one or more actuator control modules.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

With reference now to the figures, and in particular, with reference to FIG. 1, an illustration of a perspective view of an aircraft with a flap is depicted in accordance with an illustrative embodiment. In this illustrative example, aircraft 100 is shown with wings 102 that have flaps 104 attached to trailing edges 106 of wings 102. Trailing edges 106 of wings 102 are edges of wings 102 closest to tail 108 of aircraft 100.

Forces generated by flaps 104 may produce a lift and a drag for aircraft 100. Current flap systems typically include a large activation screw housed in pylons 110 attached beneath wings 102 of aircraft 100, respectively for each flap of flaps 104. Operation of flaps 104 may be directed and/or coordinated by flight control computer 112.

A large activation screw housed in pylon 110 may be commanded by actuators to extend and/or retract flaps 104 from a position flush with a trailing edge of trailing edges 106 a wing of wings 102. Each wing of wings 102 will include at least one flap of flaps 104 located along a trailing edge of trailing edges 106.

Figure 2:
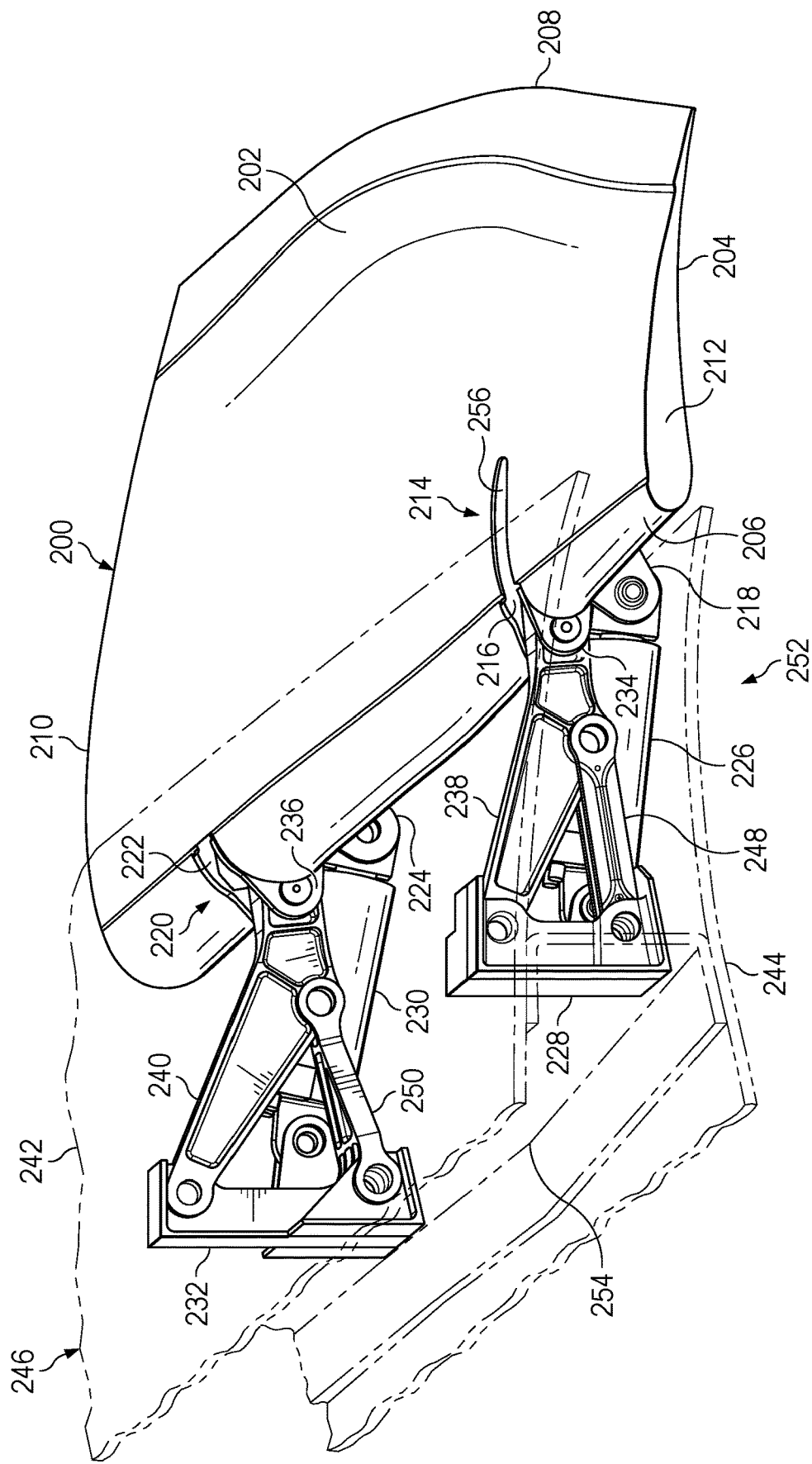
FIG. 2 is an illustration of a perspective view of: a flap, flap actuators, and attachment anchors, for the flap in a fully retracted position, depicted in accordance with an illustrative embodiment.

With reference to FIG. 2, an illustration of a flap, flap actuators, and attachment anchors, for the flap in a fully retracted position is depicted in accordance with an illustrative embodiment. In this illustrative example, flap 200 represents a non-limiting embodiment of one of flaps 104 on aircraft 100 as shown in FIG. 1. Flap 200 shown is not meant to be limiting, but is representative of any of flaps 104 on aircraft 100. One of ordinary skill in the art recognizes that without limitation, a specific curvature, span, and/or other particular characteristics of a flap on wings 102 may vary depending upon a location of flap 200 along a span of wings 102 and/or a type for aircraft 100. Specifically, flap 200 (may be referred to as an airfoil and/or a foil) is shown in a fully retracted position with: upper surface 202, lower surface 204, leading edge 206, trailing edge 208, inboard edge 210, outboard edge 212, track housing 214 with opening 216 in leading edge 206, foil clevis 218 that extends below lower surface 204 of flap 200, and track housing 220 with opening 222 and foil clevis 224 that extends below lower surface 204 of flap 200. Herein, inboard refers as closest to a body of a vehicle, such as without limitation, closest to a fuselage/airframe of aircraft 100. Fully retracted position shown in FIG. 2 is defined by flap 200 being in its closest position to spar 254 of wing 246 because actuator 226 and actuator 230 are both at retracted to their shortest length.

Actuator 226 connects to foil clevis 218 and to anchor plate 228. Actuator 230 connects to foil clevis 224 and to anchor plate 232. Track housing lug 234 extends from opening 216. Track housing lug 236 extends from opening 222.

Anchor plate 228 also attaches to track 238. Anchor plate 232 also attaches to track 240. Anchor plate 228 and anchor plate 232 are each shown with a height that fits between upper skin 242 and lower skin 244 of wing 246 (shown in dashed/cutaway portion). Anchor plate 228 and anchor plate 232 are each shown as configured to conform with and attached to spar 254 at aft end (nearest tail 108 of aircraft 100) within wing 246 between upper skin 242 and lower skin 244.

Strut 248 connects to anchor plate 228 and to track 238. Strut 250 connects to anchor plate 232 and to track 240. Strut 248 and/or strut 250 may each be configured to resist either and/or both compressive and/or tensile forces generated between track 238 and/or track 240 and anchor plate 228 and/or anchor plate 232. Strut 248 and/or strut 250 may each be a formed of many members formed as a single forged unit or as connected members. Items other than flap 200 and wing 246 may be collectively referred to as flap mounting and actuation system 252.

Extension and/or retraction of actuator 226 and actuator 230 may be controlled by flight control computer 112. Flight control computer 112 may be configured to activate in coordination with each other actuator 226 and actuator 230. Actuator 226 and actuator 230 may have similar or distinct mechanisms and/or power sources. Without limitation, actuator 226 and actuator 230 may be pistons that extend and retract under hydraulic power, electric power, pneumatic power, and/or other means of pushing foil clevis 218 and foil clevis 224, respectively away from and pulling foil clevis 218 and foil clevis 224, respectively toward wing 246.

Track housing 214 is shown with slot 256 open in upper surface 202. Slot 256 may be an opening in upper surface 202 that extends any distance above track housing 214 when (as further described below) a desired thickness for flap 200 would conflict with a movement of flap 200 along track 238. FIG. 2 does not intend to show that slot 256 must be present. FIG. 2 does not intend to show that slot 256 can only be present near an outboard edge 212 of flap 200. FIG. 2 does not intend to show that slot 256 can only be present above track housing 214, and not above track housing 220. In other words, (as further described below) because of the technological benefits provided by actuation system 252 and associated flap 200, flap 200 may be designed with a thickness that allows slot 256 to be present in upper surface 202 of flap 200 wherever desired to provide for of flap 200 without conflict with any component of actuation system 252.

Further, one of ordinary skill in the art recognizes that FIG. 2 shows only a single flap 200 of flaps 104 for aircraft 100. Flight control computer 112 for aircraft 100 may without limitation be configured to activate in coordination or separately, each individual flap of flaps 104. Hence, novel machine and process embodiments herein may be activated to control lift and drag generated by each flap of flaps 104 to produce a desired performance of aircraft 100. Hence, while novel machine and process embodiments herein may be incorporated into new aircraft designs with flight deck controls and/or indications tailored thereto, they may also be retrofit onto existing aircraft and controlled by existing flight control computers with slight modifications using existing flight deck controls and/or indications on currently existing aircraft. No modifications are needed to existing flight deck controls and/or indications on currently existing aircraft if an embodiment of the novel process and machine for flap actuation as shown at least in FIGS. 2-8B and 10 is retrofit on to the currently existing aircraft.

Hence, activation of flaps 104 by a flight control system of aircraft 100 may be controlled by inputs from an aircraft operator and/or may be dynamic, and driven by determinations from a scheduler within flight control computer 112 based upon conditions input to the scheduler. Thus, as a non-limiting example, degrees of extension of any individual flap may be scheduled to vary as an airspeed of aircraft 100 changes. flight control computer 112 may also have an algorithm/filter that functions dynamically in real-time, such that acceptable ranges for any individual condition input and/or output may change dependent upon a current value of other conditions input to the filter. The filter may be configured as program code stored in a processor.

Flight control computer 112 may process control of flaps 104 via hardware, a specially programed code in a processor, ACSI circuits, and other equipment and methods and/or combinations thereof. In an embodiment, a filter may be within a flight control computer in communication with flaps 104. In an embodiment, the filter may each be a partition within flight control computer 112.

Figure 3:
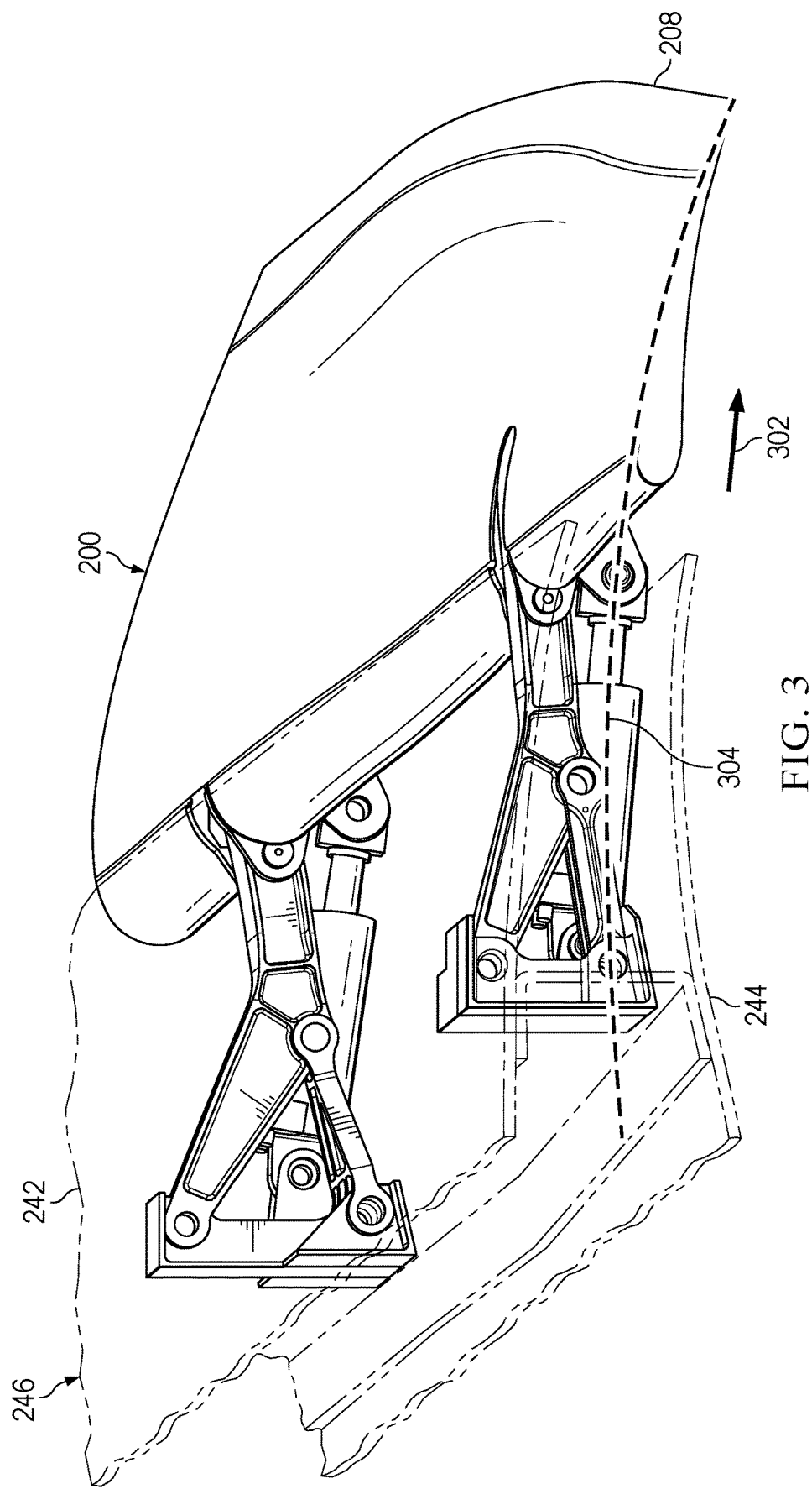
FIG. 3 is an illustration of a perspective view of: a flap, flap actuators, and attachment anchors, for the flap in an initially extended position, depicted in accordance with an illustrative embodiment.

With reference now to FIG. 3. FIG. 3 is an illustration of a perspective view of: a flap, flap actuators, and attachment anchors, for the flap in an initially extended position depicted in accordance with an illustrative embodiment. All of the same item numbering present in FIG. 2 may be considered present and applicable to similar elements in FIG. 3 and FIG. 4, but some item numbers from FIG. 2 may be left off in FIG. 3 and FIG. 4 to emphasize the item numbers shown in FIG. 3 and FIG. 4.

Arrow 302 shows a direction of extension of flap 200 when actuator 226 and actuator 230 extend to move flap 200 along track 238 and track 240 respectively away from wing 246. It is significant that initial movement of flap 200 is along, an extension of chord line 304 of wing 246. An initial path of extension of flap 200 may be essentially parallel to chord line 304 of wing 246.

One of ordinary skill in the art recognizes that initial extension of flap 200 as shown in FIG. 3 essentially increases a length of an effective chord of the combination of wing 246 and flap 200 without significantly increasing a camber of the combination of wing 246 and flap 200. Hence, one of ordinary skill in the art recognizes that initial extension of flap 200 as shown in FIG. 3 essentially increases a lift value for the combination of wing 246 and flap 200 without significantly increasing a drag value for the combination of wing 246 and flap 200. Accordingly, initial extension of flap 200 produces a technological benefit of a significant increase in a lift-over-drag ratio for the combination of wing 246 and flap 200.

Figure 4:
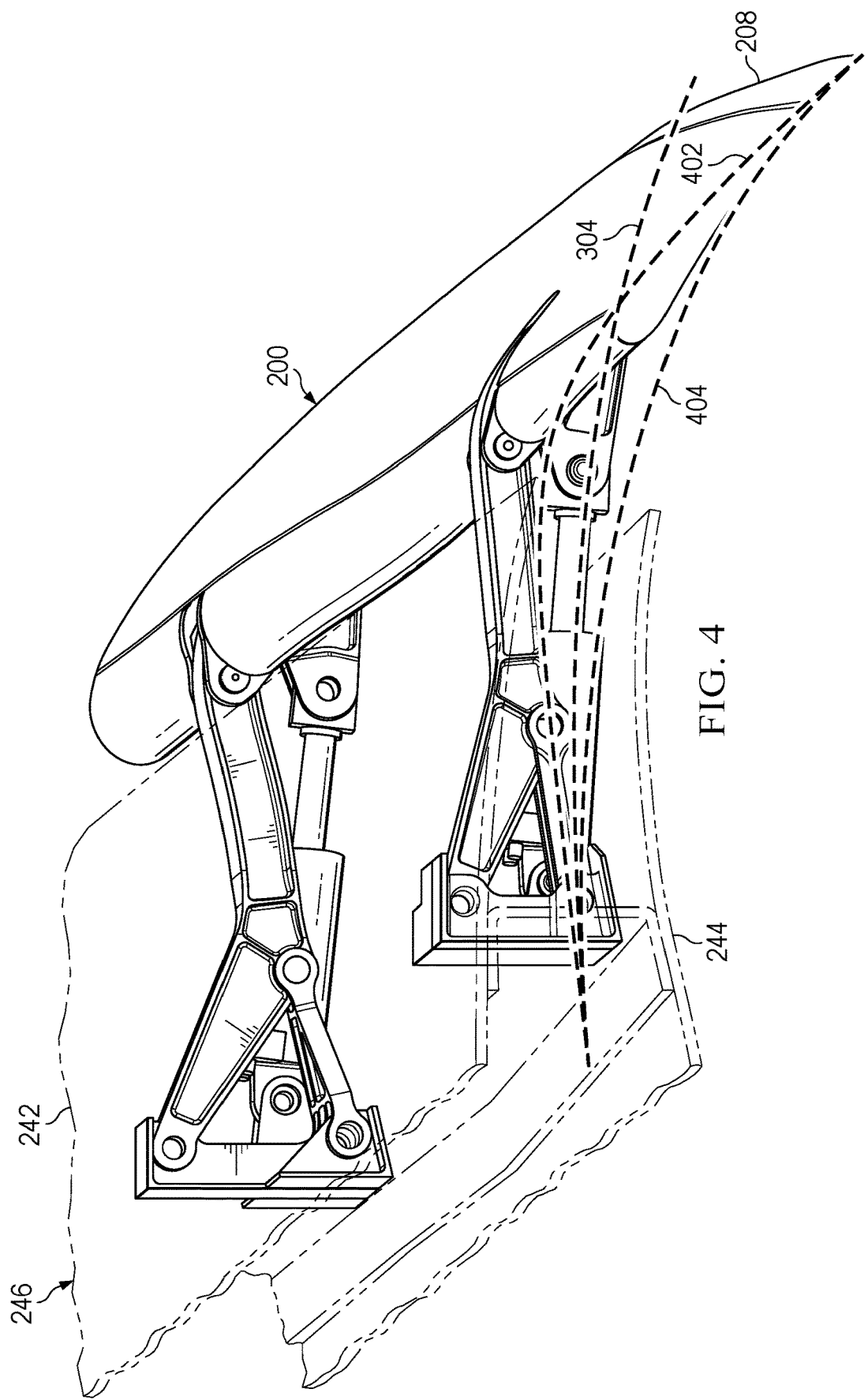
FIG. 4 is an illustration of a perspective view of: a flap, flap actuators, and attachment anchors, for the flap in a fully extended position, depicted in accordance with an illustrative embodiment.

With reference now to FIG. 4, FIG. 4 is an illustration of a perspective view of: a flap, flap actuators, and attachment anchors, for the flap in a fully extended position depicted in accordance with an illustrative embodiment. FIG. 4 shows actuator 226 and actuator 230 each fully extended, and flap 200 moved aft in track 238 and track 240 to a fully extended position. In addition to the fully extended position shown in FIG. 4, actuator 226 and actuator 230 may be controlled to extend flap 200 to any position between a fully retracted position as shown in FIG. 2, and a fully extended position as shown in FIG. 4. Extending actuator 226 and actuator 230 to their full length, moves flap 200 along track 238 and track 240 to a fully extended position of flap 200.

Line 402 indicates that when flap 200 is in fully extended position as shown in FIG. 4, that an effective camber of the combination of wing 246 and flap 200 significantly increases over an effective camber of the combination of wing 246 and flap 200 as shown for flap 200 in a fully retracted as shown in FIG. 2 or an initially extended position as shown in FIG. 3. The increased effective camber indicated by line 402 will increase lift produced by the combination of wing 246 and flap 200. The increased effective camber indicated by line 402 will also significantly increase induced drag and profile drag for the combination of wing 246 and flap 200 as compared to the initially extended position shown in FIG. 3, and even more so as compared to the fully retracted position shown in FIG. 2.

Line 404 indicates that flap 200 in fully extended position as shown in FIG. 4 does lengthen an effective chord of the combination of wing 246 and flap 200 over an effective chord of the combination of wing 246 and flap 200 as shown for flap 200 in an initially extended position as in FIG. 3. An increase in a length of the effective chord of the combination of wing 246 and flap 200 also provides an increase in the lift produced by the combination of wing 246 and flap 200.

Figure 5A:
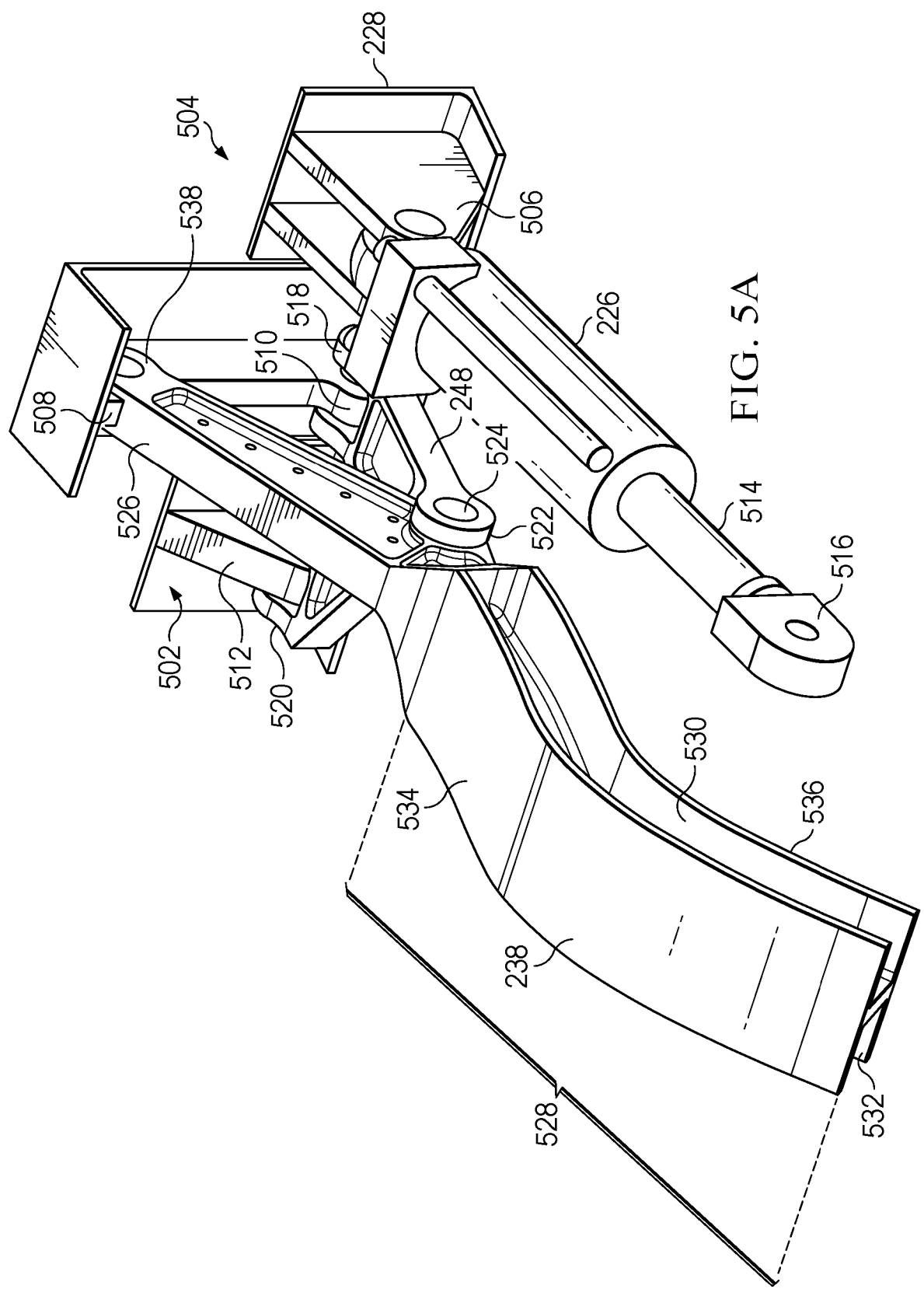
FIG. 5A is an illustration of a perspective view of a flap mounting and actuation system, depicted in accordance will an illustrative embodiment.

With reference now to FIG. 5A, FIG. 5A is an illustration of a perspective view of a flap mounting and actuation system depicted in accordance will an illustrative embodiment. FIG. 5A presents a closer view representing a portion of flap mounting and actuation system 252 introduced in FIG. 2. Depictions and discussion of actuator 226, track 238, and anchor plate 228 shown in FIGS. 5A and 5B for apply as well for actuator 230, track 240, and anchor plate 232 shown at least in FIG. 2.

Anchor plate 228 has foil side 502 and spar side 504. Anchor clevis 506, track lug 508, strut lug 510, and strut lug 512 each extend from foil side 502 of anchor plate 228. Actuator 226 connects to anchor plate 228 at anchor clevis 506.

Piston 514 is configured to extend and retract from actuator 226. Piston lug 516 is sized to rotatably mate with foil clevis 218 (not shown in FIG. 5A). One of ordinary skill in the art recognizes that actuator may have a mechanism other than piston 226 that extends and retracts piston lug 516 away from and toward anchor plate 228. Piston lug 516 is representative of any device that connects actuator 226 to foil clevis 218.

Strut 248 connects to strut lug 510 with strut clevis 518 and may also connect to strut lug 512 with strut clevis 520. End of strut 248 with strut clevis 520 and/or strut clevis 518 may be referred to as anchor end of strut 248. Strut clevis 522 attaches onto track 238 at track pin 524 and an identical track pin 540 (shown in FIG. 5B) on other side (outboard side shown in FIG. 5B) of track 238. End of strut 248 with strut clevis 522 may be referred to as a track end of strut 248.

Figure 5B:
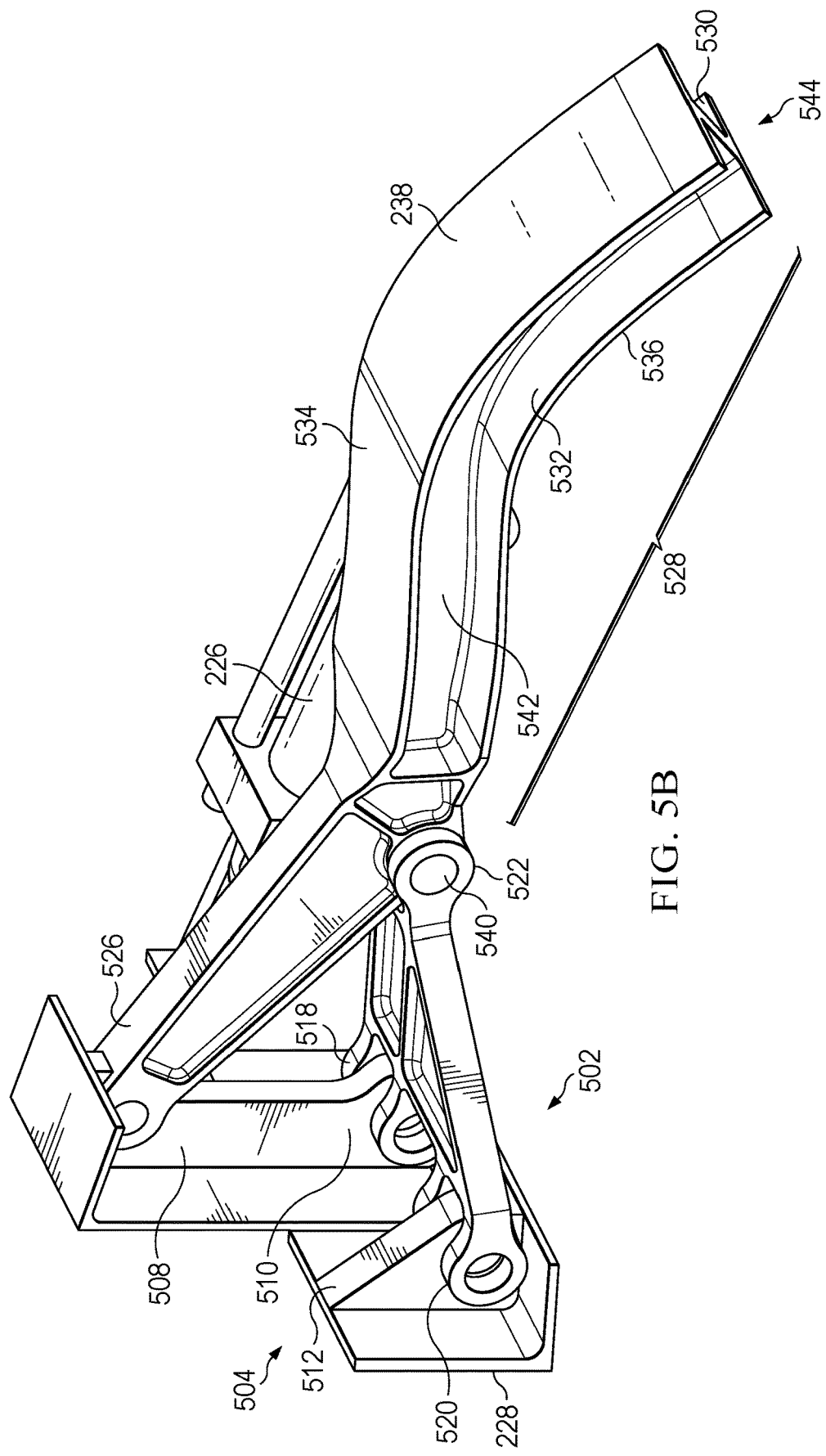
FIG. 5B is an illustration of an alternate perspective view of a flap mounting and actuation system, depicted in accordance will an illustrative embodiment.

As shown at least in FIG. 5B, anchor end of strut 248 may be broader than track end of strut 248.

Alternatively, track 248 may be connected to anchor plate 228 and braced by a strut 248 configured as a single beam (not shown) that connects to strut lug 510. In such a configuration, anchor plate 228 may lack strut lug 512.

Track 238 has bracket portion 526 and dual channel portion 528. Dual channel portion 528 has inboard channel 530 on side of track 238 that faces toward actuator 226 and outboard channel 532 on side of track 238 that faces away from actuator 226. Dual channel portion 528 may have an initial extension section 534 that has a slight curvature, and full extension section 536 that has a greater and opposite curvature from initial extension section 534. Track clevis 538 is located on bracket portion 526 at forward end of track 238 and connects to track lug 508. End of track 238 mounted closest to spar 254 in wing 246 on anchor plate 228 pay be referred to as the forward end of track 238.

Track 238 may be a single continuous element with a reversing curved shape. Curved shape of track 238 provides a necessary Fowler motion and rotation for an extension of flap 200 to provide wing 246 and aircraft 100 desired takeoff and landing performance characteristics. One of ordinary skill in the art recognizes that the length and curvature of each portion of track 238 may be adjusted in design to meet specific performance characteristics for a least a lift and a drag produced by flap 200 at each point of extension and retraction along track 238. Track 238 may be configured to support loads in tension and/or compression. Without limitation, track 238 may be forged of hardened iron and nickel based alloy 4330 steel.

With reference now to FIG. 5B, FIG. 5B is an illustration of an alternate perspective view of a flap mounting and actuation system depicted in accordance will an illustrative embodiment. FIG. 5B shows an alternate perspective view of a flap mounting and actuation system as depicted in FIG. 5A. Numbering in FIG. 5A may be considered applicable (although not shown to emphasize numbering shown on FIG. 5B) and present as well to similar elements shown in FIG. 5B. FIG. 5B adds track pin 540 on side of bracket portion 526 of track 238 that faces away from actuator 226. Divider 542 that separates inboard channel 530 from outboard channel 532 in dual channel portion 528 of track 238 is also noted. Both inboard channel 530 from outboard channel 532 are not sealed off at aft end 544 of track 238, but rather are opened. Opened channels at aft end 544 of track 238 reduces the weight of track 238 and eases mounting flap 200 onto track 238.

Strut 248 need not be formed exactly as shown in FIG. 5B, but is representative of a strut configured to make the connections shown between track 238 and anchor plate 228 such that compression and tension loads therebetween may be sustained.

Figure 6:
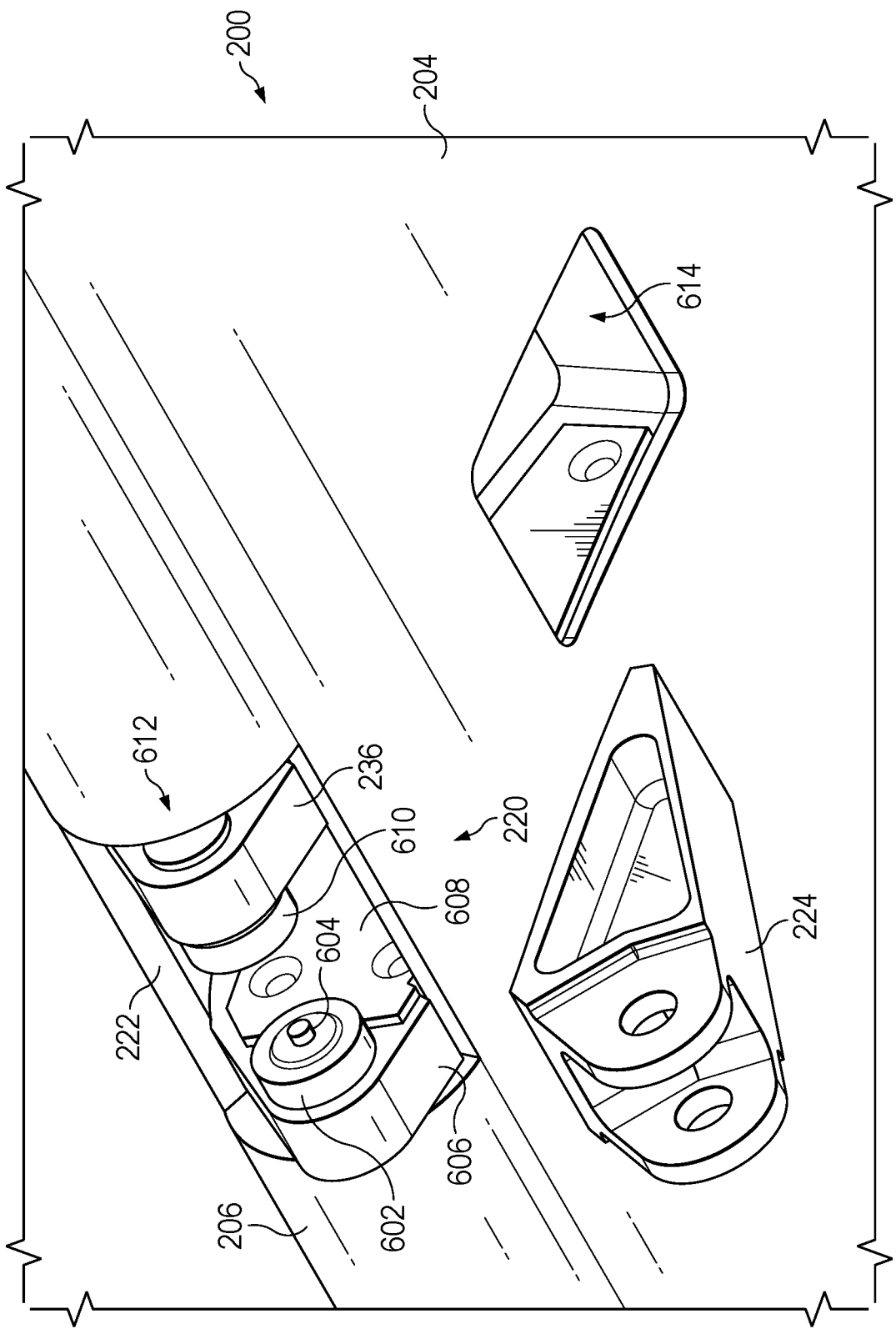
FIG. 6 is an illustration of a perspective view of a track housing within a flap, depicted in accordance with an illustrative embodiment.

With reference now to FIG. 6, FIG. 6 is an illustration of a perspective view of a track housing within a flap depicted in accordance with an illustrative embodiment. FIG. 6 is a zoomed in view on a portion of flap 200 as shown in FIG. 2. FIG. 6 may be considered as representative of track housing 214 or track housing 220 in flap 200 as shown in FIG. 2. For simplicity, FIG. 6 refers only to track housing 220.

Opening 222 in leading edge 206 of flap 200 is shown just inboard of foil clevis 224 that extends below lower surface 204 of flap 200. Roller 602 can be seen mounted on cantilever 604 that extends from track housing lug 606 that extends out from inboard side 608 of track housing 220 through opening 222 and forward of leading edge 206 of flap 200. Roller 610 is mounted on track housing lug 236 that extends from outboard side 612 of track housing 220 on a (not shown) cantilever similar to cantilever 604. Exit hole 614 in lower surface 204 allows track 240 (not shown in FIG. 6) to extend below lower surface 204 of flap 200.

Figure 7A:
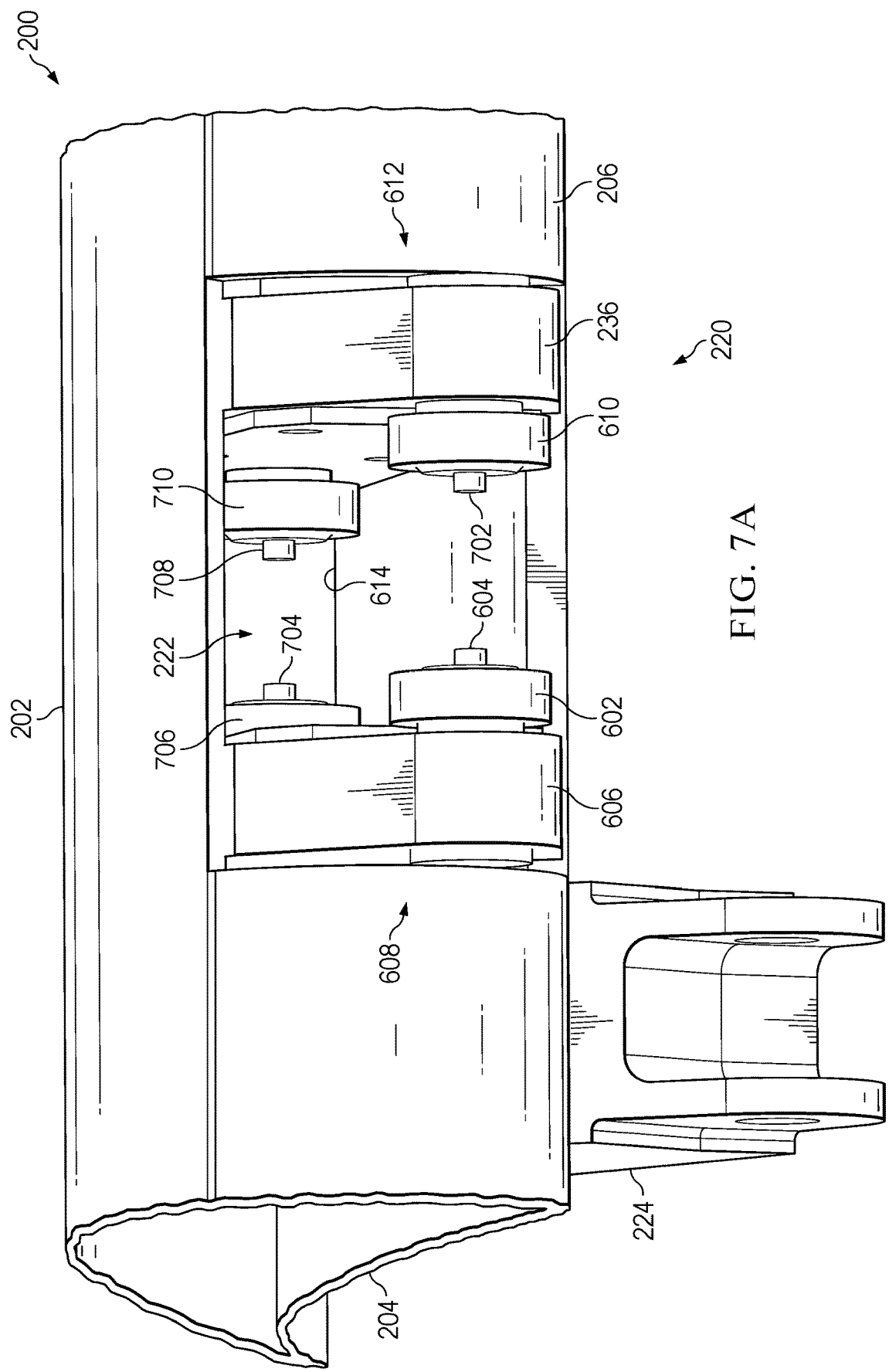
FIG. 7A is an illustration of an alternate perspective view of a track housing within a flap, depicted in accordance with an illustrative embodiment.

With reference now to FIG. 7A, FIG. 7A is an illustration of an alternate perspective view of a track housing within a flap depicted in accordance with an illustrative embodiment. FIG. 7A is a zoomed in view on a portion of flap 200 as shown in FIG. 2 and FIG. 6. FIG. 7A may be considered as representative of track housing 214 or track housing 220 in flap 200 as shown in FIG. 2. For simplicity, FIG. 7A refers only to track housing 220. FIG. 7A is a view into track housing 220 through opening 222 of leading edge 206 of flap 200. Exit hole 614 through lower surface 204 of flap 200 is shown at aft end of track housing 220. Roller 602 is mounted on cantilever 604 that extends from track housing lug 606 that extends out from inboard side 608 of track housing 220 through opening 222 and forward of leading edge 206 of flap 200. Roller 610 is mounted on cantilever 702 that extends from track housing lug 236 that extends from outboard side 612 of track housing 220 through opening 222 and forward of leading edge 206 of flap 200. Cantilever 704 extends from inboard side 608 within track housing 220 closer to exit hole 614. Roller 706 is mounted on cantilever 704. Cantilever 708 extends from outboard side 612 within track housing 220 closer to exit hole 614. Roller 710 is mounted on cantilever 704 on outboard side 612 of track housing 220. Foil clevis 224 extends from lower surface 204 of flap 200 inboard of track housing lug 606 without actuator 230 connected.

Figure 7B:
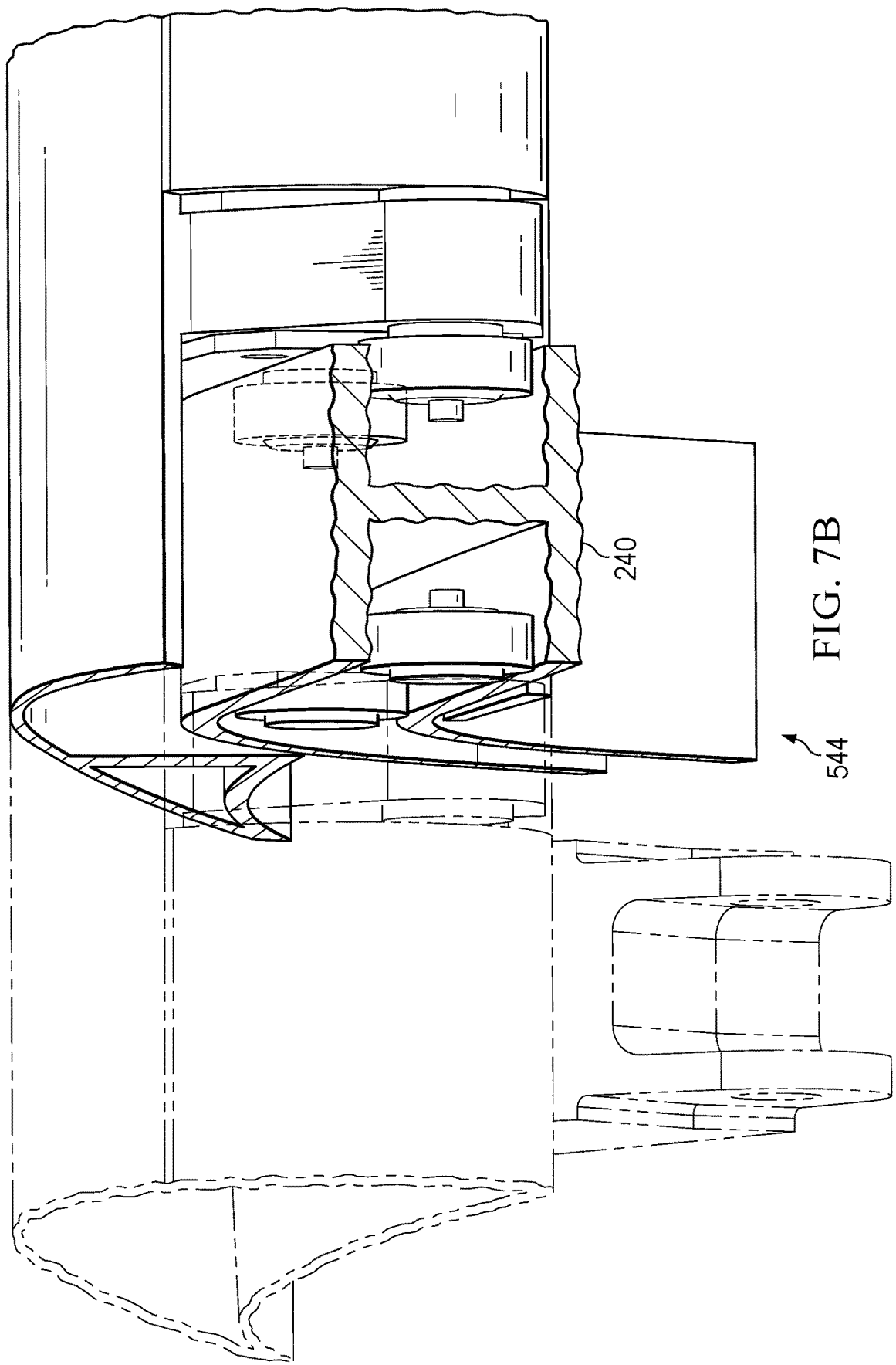
FIG. 7B is an illustration of a perspective view of a track housing within a flap with a track engaged therewith, depicted in accordance with an illustrative embodiment.

With reference now to FIG. 7B, FIG. 7B is an illustration of a perspective view of a track housing within a flap with a track engaged therewith, depicted in accordance with an illustrative embodiment. FIG. 7B is a zoomed in view on a portion of flap 200 as shown in FIGS. 2, 6, and 7A. Numbering in FIG. 7A may be considered applicable (although not shown to emphasize numbering shown on FIG. 7B) and present as well for similar elements shown in FIG. 7B.

FIG. 7B may be considered as representative of track housing 214 or track housing 220 in flap 200 as shown in FIG. 2. For simplicity, FIG. 7A refers only to track housing 220. FIG. 7A is a view into track housing 220 through opening 222 of leading edge 206 of flap 200. Exit hole 614 through lower surface 204 of flap 200 is shown at aft end of track housing 220. Inboard track channel 530 can be seen engaging with and guided by roller 602 and roller 706. Outboard track channel 532 can be seen engaging with and guided by roller 610 and 710. Foil clevis 224 extends from lower surface 204 of flap 200 inboard of track housing lug 606 without actuator 230 connected.

Figure 8A:
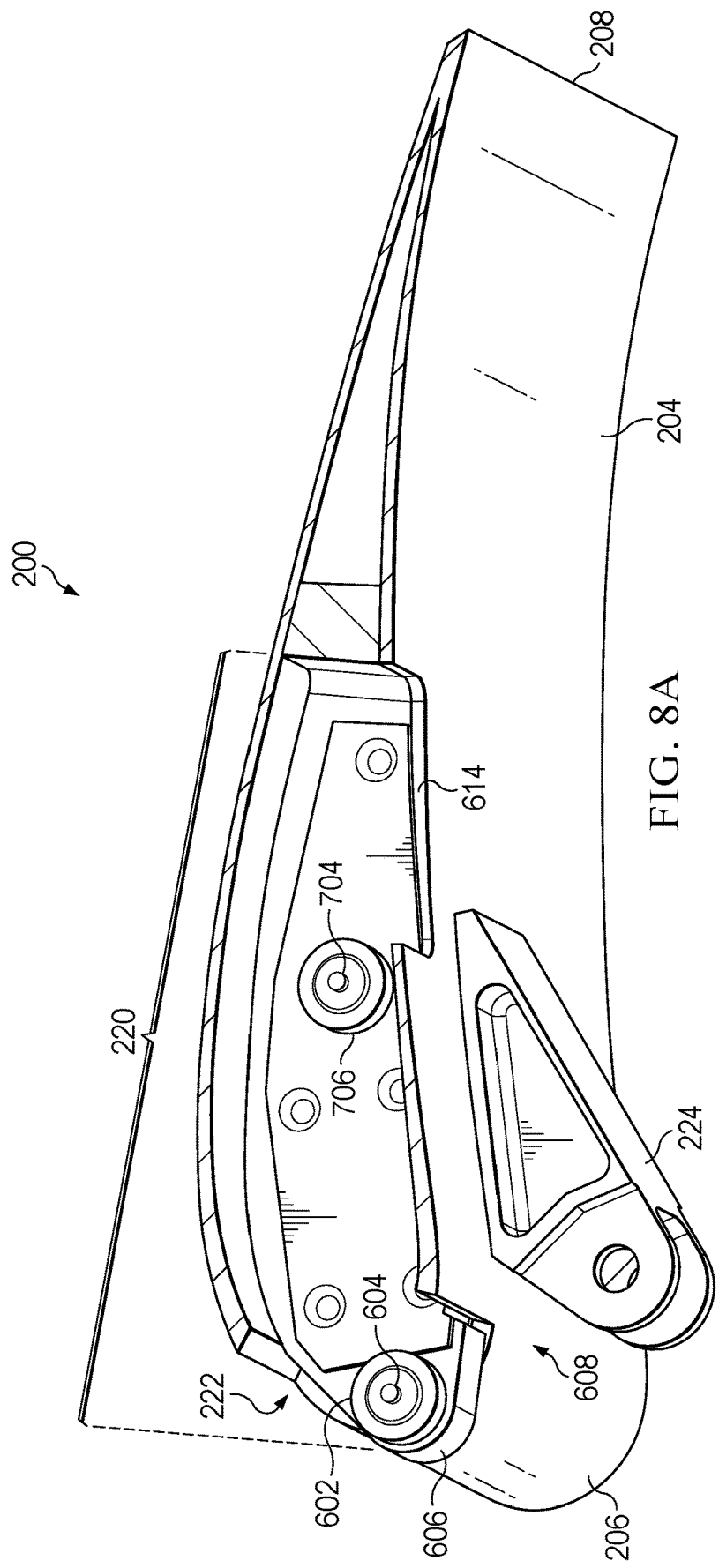
FIG. 8A is an illustration of a cross section view of a track housing within a flap depicted in accordance with an illustrative embodiment.

With reference now to FIG. 8A, FIG. 8A is an illustration of a cross section view of a track housing within a flap depicted in accordance with an illustrative embodiment. Exit hole 614 through lower surface 204 of flap 200 is shown at aft end of track housing 220, closest to trailing edge 208 of flap 200. Roller 602 is mounted on cantilever 604 that extends from track housing lug 606 that extends out from inboard side 608 of track housing 220 through opening 222 and forward of leading edge 206 of flap 200. Cantilever 704 extends from inboard side 608 within track housing 220 closer to exit hole 614. Roller 706 is mounted on cantilever 704. Foil clevis 224 extends from lower surface 204 of flap 200 inboard of track housing lug 606.

Figure 8B:
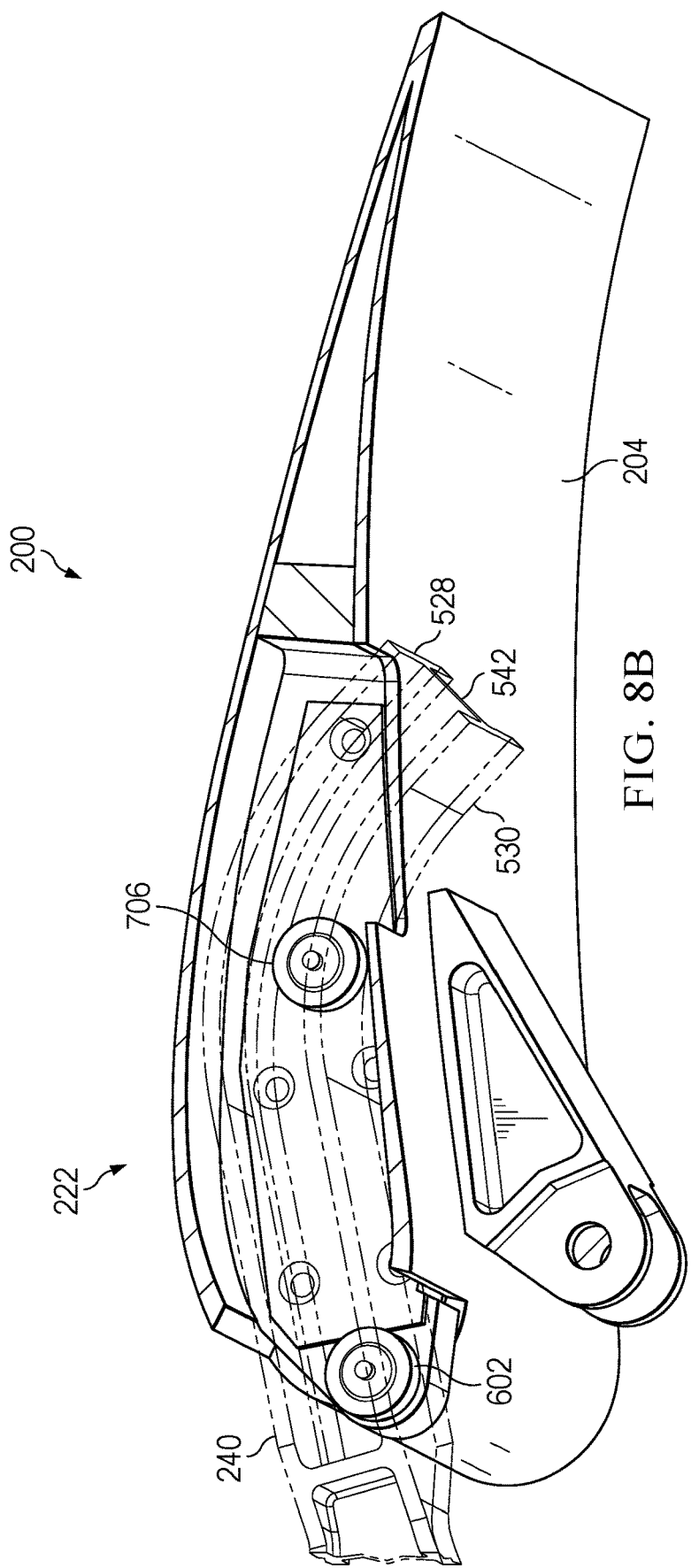
FIG. 8B is an illustration of a cross section view of a track in a track housing within a flap depicted in accordance with an illustrative embodiment.

With reference now to FIG. 8B, FIG. 8B is an illustration of a cross section view of a track in a track housing within a flap depicted in accordance with an illustrative embodiment. FIG. 8B shows inboard channel 530 of dual channel portion 528 of track 240 engaged with roller 602 and roller 706 in track housing 220 as situated when actuator 230 is in fully retracted position as shown in FIG. 2. Aft end 542 of track 240 extends out through exit hole 614 and below lower surface 204 of flap 200.

Figure 9:
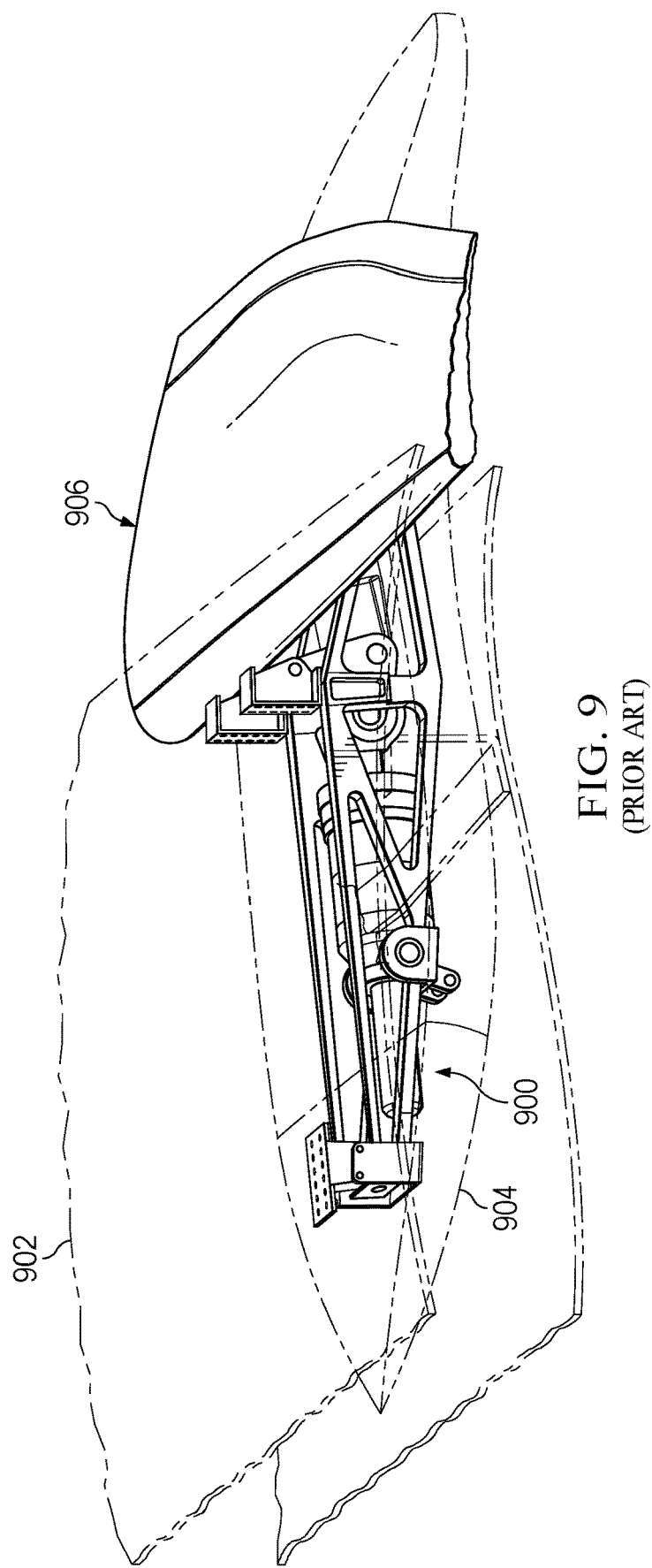
FIG. 9 is an illustration of a perspective view of an activation system for flaps and pylon therefor common on current aircraft in accordance with an illustrative embodiment.

With reference now to FIG. 9, FIG. 9 is an illustration of a perspective view of an activation system for flaps and pylon therefor common on current aircraft in accordance with an illustrative embodiment. FIG. 9 shows activation system 900 for flaps common to current aircraft mounted under current wing 902 inside pylon 904 configured to activate extension and retraction of flap 906 common to current aircraft that lack novel flap track housing 238 or track housing 240 within flap 200. Activation system 900 is located wholly beneath wing 902 and flap 906 and does not penetrate flap 906. Hence pylon 904 must be large enough to fully cover all of activation system 900, which may include large screw type actuator and significant tracks external to flap 906 and covered by pylon 904. Current activation system 900 and tracks associated therewith for flaps on current aircraft is larger and heavier than novel system shown in FIGS. 2-8B with tracks that are supported within flap 200 via rollers mounted within flap 200.

Typically, two pylons such as without limitation, pylon 904 are mounted to move each flap 906 sized and constructed on current subsonic aircraft. Pylon 904 is relatively large compared to a thickness of a current subsonic wing and produces a significant amount of profile drag, particularly as airspeed increases toward a transonic range.

Figure 10:
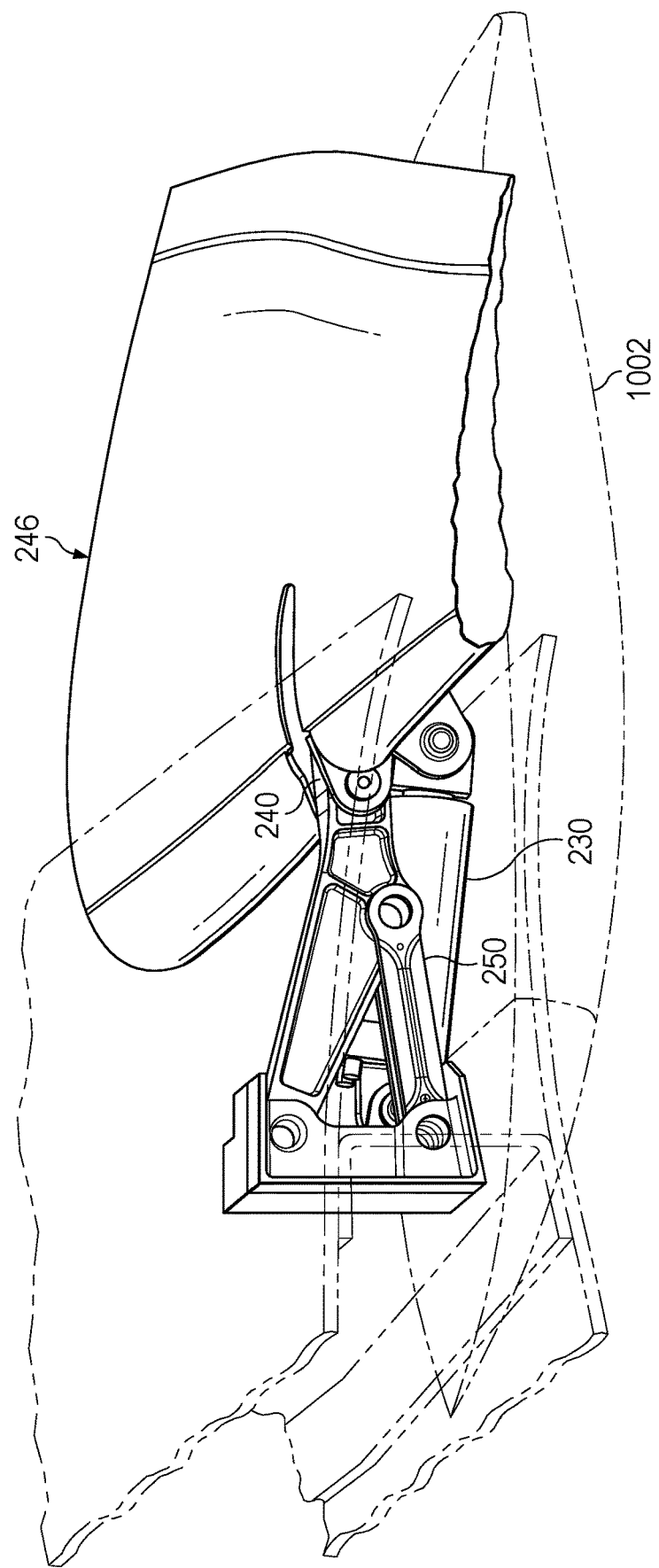
FIG. 10 is an illustration of a perspective view of a novel pylon configured to cover a novel flap actuation system, depicted in accordance with an illustrative embodiment.

With reference now to FIG. 10, FIG. 10 is an illustration of a novel pylon configured to cover a novel flap actuation system, depicted in accordance with an illustrative embodiment. Pylon 1002 is shown mounted below wing 246. All numbering in FIGS. 2-8B may be considered applicable (although not shown to emphasize numbering shown on FIG. 10) and present as well for similar elements shown in FIGS. 2-8B. Pylon 1002 covers portion of track 240, strut 250, and actuator 230 that extend down below wing 246.

Without limitation, pylon 1002 may have a length that extends, with actuator 230 in a fully retracted position), from at least spar side 504 of anchor plate 228 to beyond trailing edge 208 of foil 200. Without limitation, pylon 1002 may have a width between the upper surface and the lower surface that may be less than a thickness of a distance between upper skin 242 and lower skin 244 of wing 246 to which anchor plate 228 is configured to attach.

Unlike current flap systems, track 240 resides within track housing 220 that is within flap 200, at least a size, weight, drag, and cost of manufacturing and/or operating an embodiment of the novel process and machine for flap actuation as shown at least in FIGS. 2-8B and 10 is beneficially less than for an activation system for flaps and pylon therefor common on current aircraft as shown in FIG. 9. Further, the width of pylon 904 may also be further reduced and/or minimized when an actuator such as without limitation, actuator 230 is located inboard of inboard side 608 of track housing 220. In other words, for a mounting on a swept wing, such as without limitation wing 246, actuator 230 and associated track 240 are generally within the shadow of one another in a relative wind flowing across wing 246 if actuator 230 is mounted on inboard side of track 240. Reducing a width of pylon 904 will further reduce a profile drag produced by pylon 904.

Specifically, an embodiment of the novel process and machine for flap actuation as shown at least in FIGS. 2-8B and 10 allows a diameter and/or a length of an extension stroke of actuator 230 to be on the order of one-half the size of activating mechanisms such as activation system 900 used on current aircraft to produce flap extensions that provide a similar total lift performance for a same aircraft 100. Hence, an embodiment of the novel process and machine for flap actuation as shown at least in FIGS. 2-8B and 10 reduces a wetted area of a pylon covering actuation system 252 by 75 percent as compared to pylon 904 of a typical transport aircraft and a reduction of associated profile drag. The resultant reduction of profile drag from the reduced wetted area improves a lift over drag ratio for aircraft 100 at cruise speeds without limitation, by one percent with an embodiment of the novel process and machine for flap actuation as shown at least in FIGS. 2-8B and 10 as opposed to being configured with currently common activating mechanisms such as activation system 900 being used on aircraft 100. Thus, fuel efficiency and aircraft 100 performance such as without limitation, at least range and service ceiling may increase.

Because of the significant reduction in profile drag of pylon 1002 as compared to pylon 904 currently used, overall flap design may be changed so that a same amount of lift augmentation is provided to wing 902 with a greater number of smaller flaps without increasing total drag, but instead actually reducing total drag. Most commonly in current aircraft designs, a flap adjacent to a fuselage is activated by one pylon, and by mechanisms mounted at a wing root along the fuselage. Flaps not adjacent to the fuselage typically are supported and activated by mechanisms stored within two pylons.

For aircraft with long wings, such as without limitation a B777-300 aircraft, current aircraft designs may include three flaps mounted on each wing. In contrast, as a non-limiting example, where wing 902 with pylon 904 being used may have three flaps such as flap 906 and thus a requirement for five pylons similar to pylon 904 to provide a given amount of lift, an embodiment of the novel process and machine for flap actuation as shown in FIGS. 2-8B and 10, may have four flaps such as flap 200 may be mounted along wing 246 to provide a same amount of lift. Four flaps such as flap 200 may cover a same span along wing 246 as do the three flaps such as flap 906 do along wing 902 or may extend to a greater span. In either case, a span of each flap 200 may be less than a span of each flap 906 found commonly on current aircraft.

Thus, each flap 200 may carry less load and/or stress than each flap 906. Without limitation, a smaller size of each flap 200 as compared to each flap 906 may reduce loads carried by each flap 200 by 25 percent as compared to each flap 906. Additionally, being able to place more flaps 200 along trailing edge of wing 246 provides for more options and precision in augmenting a total lift provided by wing 246.

Focusing on technological benefits in profile drag, as a non-limiting example, four flaps such as flap 200 mounted on wing 246, seven pylons such as pylon 1002 would be mounted under wing 246. Because each pylon 1002 reduces wetted area by 75 percent as compared to each pylon 904, the seven novel pylons like pylon 1002 needed to activate the four flaps like flap 200 has only 35 percent or just one-third of the wetted area from pylons like 904 as compared for an aircraft with three flaps like flap 902 with pylons like pylon 904 profile drag is significantly reduced, and the lift to drag ration for aircraft 100 in cruise may be improved without limitation, by one percent. Thus, fuel efficiency and aircraft 100 performance such as without limitation, at least range and service ceiling may increase.

Current designs for a typical narrow-body transport aircraft lacking long wingspans commonly have two flaps like flap 902 on each wing, and thus three pylons like pylon 904. An embodiment of the novel process and machine for flap actuation as shown at least in FIGS. 2-8B and 10 may use three flaps like flap 200 on each wing 246, and thus five pylons like pylon 1002. Because each pylon 1002 has 75 percent less wetted area than each pylon 904, the five novel pylons like pylon 1002 needed to activate the three flaps like flap 200 would produce only 42 percent or approaching one-half of the wetted area for pylons for an aircraft with two flaps like flap 902 with pylons like pylon 904 as is currently used. Thus, profile drag for aircraft 100 with pylons like pylon 1002 in place of pylon 904 is significantly reduced, and the lift to drag ration for aircraft 100 in cruise will be improved. Thus, fuel efficiency and aircraft 100 performance such as without limitation, at least range and service ceiling may increase.

Accordingly, each flap 200 of the four flaps need only carry three-quarters of the load of each flap 906 for a high aspect ratio wing or two-thirds of the load of each flap 906 on a more common aspect ratio wing. Therefore, an embodiment of the novel process and machine for flap actuation as shown at least in FIGS. 2-8B and 10 need not have as substantial a structure, nor therefore, as powerful an actuation mechanism as do current flaps and their activating systems. Hence, an embodiment of the novel process and machine for flap actuation as shown at least in FIGS. 2-8B and 10 provides the additional technological benefit of each flap 200 activated by actuators like actuator 230 in pylons sized like pylon 1002 be constructed with lighter and/or smaller substructure as compared to flaps like flap 906.

Further still, with the lighter load being carried on each flap 200 as compared to flap 906, an embodiment of the novel process and machine for flap actuation as shown at least in FIGS. 2-8B and 10 may provide the additional technological benefit that upper surface 202 need not be formed only as a single continuous sheet, but may have slot 256 open in upper surface 202 above track housing 214 as shown in FIG. 2. In other words, stress loads across flap 200 are less than stress loads across flap 906. The reduced stresses across upper surface 202 allow upper surface 202 to be made from material other than aluminum alloys common on current flaps. Without limitation, flap 200 maybe formed of resin and fiber composites, plastics, and/or laminates that allow configurations tailored for specific desired load and/or stress distributions around slot 256 open in upper surface 202 above track housing 214 as shown in FIG. 2. In contrast, current flap sizes, designs, and flap activation systems produce stresses and/or loads that cannot be carried in those flaps unless their upper surfaces are a continuous surface that lacks slots extending therethrough.

Hence, an embodiment of the novel process and machine for flap actuation as shown at least in FIGS. 2-8B and 10 allows a thickness of flap 200 to be reduced even further, at least because reduced stresses and tailored materials allow a portion of upper surface 202 in flap 200 to be cut out to allow track 238 to extend up through upper surface 202. In other words, because upper surface 202 above track housing 214 may have slot 256 open that allows track 238 to protrude above upper surface 202, track housing 214 need not have a full height required to enclose track 238 within an interior of flap 200 throughout extension and/or retraction of flap 200. Thus, a thickness required for flap 200 need not be as great as if upper surface 202 had to be a continuous piece of material without slot 256 cut therein. A reduced thickness of flap 200 may allow a profile drag and/or a weight of flap 200 to also be reduced, all of which may increase a fuel efficiency and/or performance characteristics for aircraft 100, and particularly so when aircraft 100 operates at cruise speeds approaching and/or in the transonic range.

One of ordinary skill in the art recognizes that while all of the above-described benefits of an embodiment illustrated for a novel machine and process for flap actuation as shown at least in FIGS. 2-8B and 10 are significant at subsonic speeds, that their magnitude and significance increases notably when speeds of aircraft 100 increase intro a transonic range. Hence, the benefits of reductions in thickness and width and profile and weight described for embodiments illustrated for a novel machine and process for flap actuation as shown at least in FIGS. 2-8B and 10 enable increased performance capabilities and reduced operating cost for use on aircraft designed for transonic flight.

Figure 11:
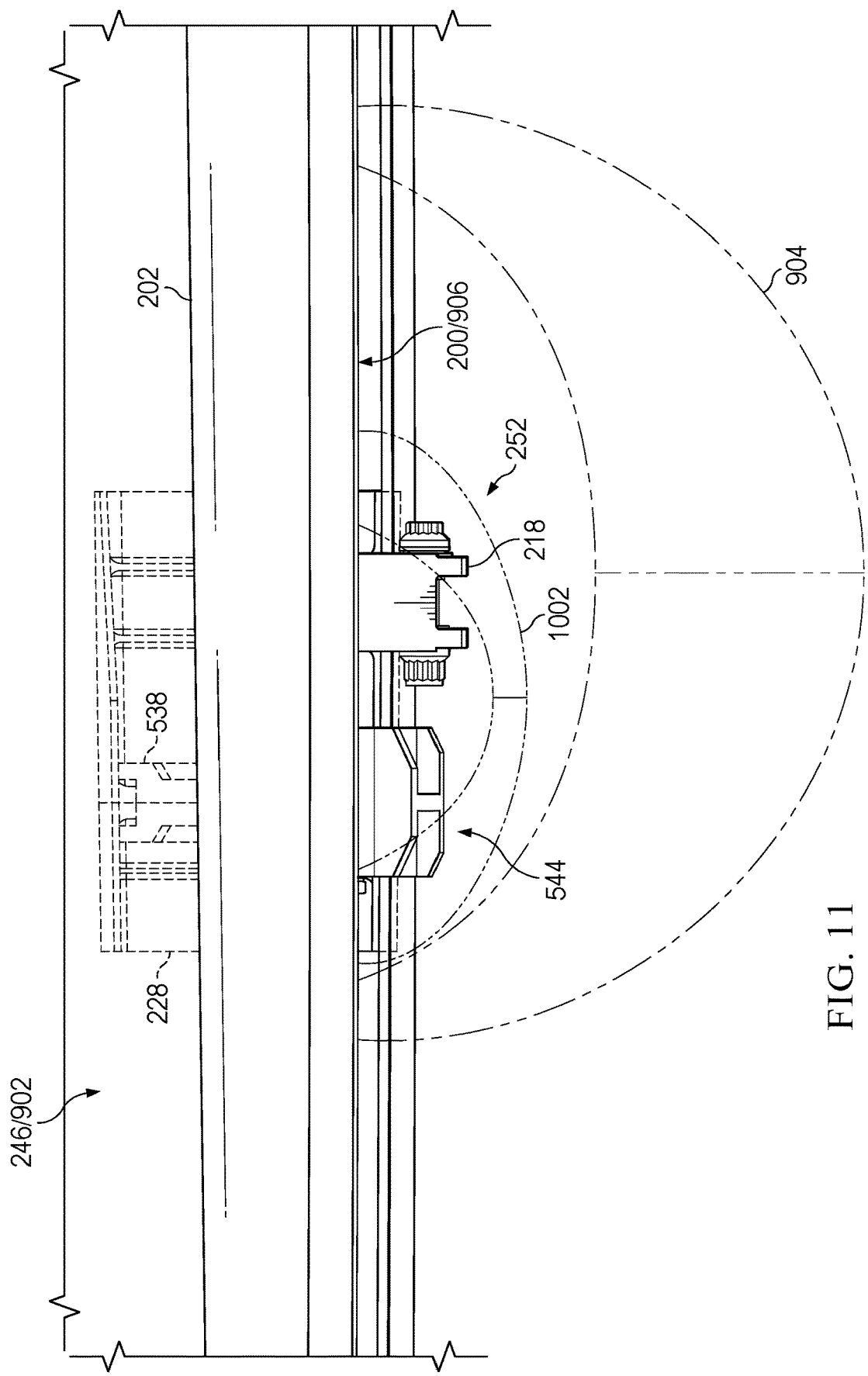
FIG. 11 is an illustration of a flowchart of a process for forming a flap system, depicted in accordance with an illustrative embodiment.

With reference now to FIG. 11, FIG. 11 is an illustration of a perspective view of a comparison of a profile of a novel pylon covering a novel flap actuation system as compared to a typical current pylon covering a typical activation system for current flaps, depicted in accordance with an illustrative embodiment. FIG. 11 shows a relative profile difference between pylon 904 typical of pylons currently mounted on aircraft wings, and pylon 1002 representing an embodiment of the novel process and machine for flap actuation as shown at least in FIGS. 2-8B and 10.

With reference now to FIG. 12, FIG. 12 is an illustration of a flowchart of a process for forming a flap system, depicted in accordance with an illustrative embodiment. Specifically, FIG. 12 shows process 1200 for forming a flap system. Process 1200 may begin by forming a track housing within a flap system that comprises:

a foil that comprises an upper surface, a lower surface, a leading edge, a trailing edge, an inboard edge, an outboard edge, and the track housing within the foil, wherein the track housing is defined by:
        the upper surface;
        the lower surface;
        an opening at the leading edge that extends, toward the trailing edge, between the upper surface and the lower surface and terminates before the trailing edge in an exit hole in the lower surface;
    two track housing lugs that extend out from the opening and beyond the leading edge;
    a foil clevis that extends below the lower surface;
    a track that comprises a bracket portion that comprises a forward end, a dual channel portion that comprises an aft end, and a curved shape configured to:
        support the foil; and
        guide a movement of the foil;
    an anchor plate that comprises a track lug, two strut lugs, and an anchor clevis that all extend from a foil side of the anchor plate;
    an actuator configured to connect to the foil clevis and to the anchor clevis, and to extend and retract the foil; and
    a pylon that comprises:
        a length that extends, with the actuator in a fully retracted position, from a spar side of the anchor plate to beyond the trailing edge of the foil; and
        a depth that encloses a section of the dual channel portion of the track that extends, with the actuator in a fully retracted position, out the exit hole and beneath the lower surface (operation 1202).

Process 1200 for forming a flap system may continue by attaching the foil to a wing by: attaching the anchor plate to the wing, attaching the forward end of the track to the track lug, attaching a strut to the two strut lugs and to the bracket portion of the track, and attaching the actuator to the anchor clevis and to the foil clevis (operation 1204).

Process 1200 for forming a flap system may continue by covering, with the pylon: the actuator, the foil clevis, and the section of the dual channel portion of the track that extends, with the actuator in a fully retracted position, out the exit hole and beneath the lower surface (operation 1206).

Although FIG. 2 only shows a single flap 200 on a portion of wing 246, wing 246 may contain more than one flap 200. FIG. 2 and FIG. 3 show track housing 220 that is fully covered by upper surface 202 of flap 200 and track housing 214 that is at least partially uncovered by upper surface 202 of flap 200. Depending upon a location and desired thickness of flap 200, each track housing 220 and/or track housing 214 may be either fully covered or at least partially uncovered by upper surface 202 of flap 200. Loading and/or stresses on current flap designs and materials on current aircraft do not allow for a noncontinuous span across upper surface of current flaps.

Thus, the technical benefits of an embodiment of the novel process and machine for flap actuation as shown at least in FIGS. 2-8B and 10 include at least being able to activate a smaller, thinner, lighter, flap 200 than found on current aircraft due to tracks for extending and retracting flap 200 being located within a body of flap 200. Further, when retrofit onto an existing aircraft, an operator sending a command to extend or retract flap 200 needs no additional training to issue commands to operate an embodiment of the novel process and machine for flap actuation as shown at least in FIGS. 2-8B and 10. The flight deck controls and indications in aircraft 100 and the commands an operator would issue with flap 200 retrofit onto aircraft 100 may remain the same as presently exist and would be issued to aircraft 100 with a current flap 906. Hence, the technical benefits provided by an embodiment of the novel process and machine for flap actuation as shown at least in FIGS. 2-8B and 10 may not only be realized on newly designed aircraft for operation at transonic speeds and/or subsonic speeds, but may also be realized on current aircraft operating at subsonic and/or transonic speeds.

Alternatively, existing flight control systems and/or computers could be modified to allow for manual and/or automatic activation of flap 200. On aircraft 100 with more than one flap 200, differential and/or independent activation of each flap 200 may also be programmed or manually directed. An embodiment of the novel process and machine for flap actuation as shown at least in FIGS. 2-8B and 10 may be configured for "fly-by wire" (FBW) control systems, or for traditional cabled flight control systems that are mechanically connected to a command input device. A fly-by-wire (FBW) system for an aircraft is a system that replaces the traditional flight controls of an aircraft, which are mechanically connected to an input command device, with an electronic interface.

For FBW, the input command device is not connected to the flight control surfaces, engines, or other systems by cables, linkages, or other mechanical systems, as in conventional aircraft. Instead, the movements of flight controls are converted to electronic signals transmitted by wires, optical fibers, over an air-interface, or some combination thereof.

The different components in a fly-by-wire system may communicate with each other using different types of communications architectures. For example, some fly-by-wire systems use wires that connect the components directly to each other. In this example, multiple wires can be used to provide redundant connections between the components.

In other examples, a fly-by-wire system may use a data bus, such as those used in computer systems. The data bus may reduce the amount of wiring between components. Wireless transmission of command signals may also be used.

For example, flight control computers in a fly-by-wire system use signals to identify how to move the actuators for each flight control surface to provide the desired aircraft response to the movement of the flight controls. Further, flight control computers also may perform functions without input from a pilot. Commands may be generated from other sources, such as without limitation flight control computer 112, and/or a controller linked to the aircraft from outside the aircraft.

An aircraft with a fly-by-wire system can be lighter in weight than when using conventional controls. Electronic systems in a fly-by-wire system require less maintenance as compared to flight control systems using purely mechanical systems and hydraulic systems.

Redundancy is present in fly-by-wire systems for aircraft. Multiple flight control modules in the fly-by-wire system may be used to generate commands in response to receiving signals from the movement of flight control-external sensing devices. The different components in a fly-by-wire system may communicate with each other using different types of communications architectures. For example, some fly-by-wire systems use wires that connect the components directly to each other. In this example, multiple wires can be used to provide redundant connections between the components.

In other examples, a fly-by-wire system may use a data bus, such as those used in computer systems. The data bus may reduce the amount of wiring between components.

Accordingly, in an embodiment with a FBW flight control system, flap 906 may be replaced by flap 200 that receives all signals that would have been intended for flap 906. Thus, an embodiment of the novel process and machine for flap actuation as shown at least in FIGS. 2-8B and 10 may provide a novel technical effect necessary for a process for reducing a size of a flap system mounted currently for a particular aircraft model. An embodiment of the novel process and machine for flap actuation as shown at least in FIGS. 2-8B and 10 provides a novel technical effect of augmenting lift for aircraft 100 while reducing drag as compared to current flap systems and their associated activation components. An embodiment of the novel process and machine for flap actuation as shown at least in FIGS. 2-8B and 10 provides a further technical effect of reducing a weight of aircraft 100 by replacing a weight of current flap systems and their associated activation components with an embodiment of the novel process and machine for flap actuation as shown at least in FIGS. 2-8B and 10 right on the particular aircraft model.

When aircraft 100 includes a fly-by-wire flight control system, an embodiment of the novel process and machine for flap actuation as shown at least in FIGS. 2-8B and 10 may be a component of a fly-by-wire flight control system. As such, an embodiment of the novel process and machine for flap actuation as shown at least in FIGS. 2-8B and 10 may communicate with or be considered associated with and/or connected to a part of flight control computer 112. As such, control over an embodiment of the novel process and machine for flap actuation as shown at least in FIGS. 2-8B and 10 may be considered to include specialized program code operating in a data processing system.

Similarly, an embodiment of the novel process and machine for flap actuation as shown at least in FIGS. 2-8B and 10 may communicate and operate in conjunction with a direct lift control system such as without limitation that described in U.S. Pat. Nos. 8,712,606 and 9,415,860, assigned to The Boeing Company. Accordingly, the features presented in U.S. Pat. Nos. 8,712,606 and 9,415,860, assigned to The Boeing Company, are incorporated herein in their entirety.

Similarly, an embodiment of the novel process and machine for flap actuation as shown at least in FIGS. 2-8B and 10 may communicate and operate in conjunction with yaw generating systems such as without limitation those described in U.S. Pat. No. 7,367,530, assigned to The Boeing Company. Accordingly, the features presented in U.S. Pat. No. 7,367,530, assigned to The Boeing Company, are incorporated herein in their entirety.

As such, controls over an embodiment of the novel process and machine for flap actuation as shown at least in FIGS. 2-8B and 10 may be associated with a data processing system that includes a communications fabric, which provides communications between a processor unit, memory, persistent storage, communications unit, input/output (I/O) unit, and a display.

The processor unit may serve to execute instructions for software that may be loaded into the memory. In an embodiment, the processor unit be a set of one or more processors or may be a multi-processor core, depending on the particular implementation. In an embodiment, the processor unit may represent flight control computer 112 and may be a set of one or more processors or may be a multi-processor core, depending on the particular implementation.

Further, the processor unit may be implemented using one or more heterogeneous processor systems in which a main processor is present with secondary processors on a single chip. As another illustrative example, the processor unit may be a symmetric multi-processor system containing multiple processors of the same type.

Memory, in these examples, may be, for example, a random access memory or any other suitable volatile or non-volatile storage device. Persistent storage may take various forms depending on the particular implementation. For example, persistent storage may contain one or more components or devices. For example, persistent storage may be a hard drive, a flash memory, a rewritable optical disk, a rewritable magnetic tape, or some combination of the above. The media used by persistent storage also may be removable. For example, a removable hard drive may be used for persistent storage.

Communications unit, in these examples, may provide for communications with other data processing systems or devices. In these examples, the communications unit is a work interface card. The communications unit may provide communications through the use of either or both physical and wireless communications links.

The input/output unit may allow for input and output of data with other devices that may be connected to the data processing system. For example, the input/output unit may provide a connection for user input through a keyboard and mouse. Further, the input/output unit may send output to a printer. A display may provide a mechanism to display information to a user.

Instructions for associated operating systems and applications or programs may be located on persistent storage. These instructions may be loaded into memory for execution by the processor unit. The processes of the different embodiments may be performed by the processor unit using computer implemented instructions, which computer may be located in a memory. These instructions are referred to as program code, computer usable program code, or computer readable program code that may be read and executed by a processor in the processor unit. The program code in the different embodiments may be embodied on different physical or tangible computer readable media.

Program code may be located in a functional form on computer readable media that is selectively removable and may be loaded onto or transferred to the data processing system for execution by processor unit. Program code and computer readable media form a computer program product in these examples. In one example, computer readable media may be in a tangible form, such as, for example, an optical or magnetic disc that is inserted or placed into a drive or other device that is part of persistent storage for transfer onto a storage device, such as a hard drive that is part of the persistent storage. In a tangible form, computer readable media also may take the form of a persistent storage, such as a hard drive, a thumb drive, or a flash memory that is connected to the data processing system. The tangible form of computer readable media is also referred to as computer recordable storage media. In some instances, computer readable media may not be removable.

Alternatively, program code may be transferred to the data processing system from computer readable media through a communications link to the communications unit and/or through a connection to the input/output unit. The communications link and/or the connection may be physical or wireless in the illustrative examples. The computer readable media also may take the form of non-tangible media, such as communications links or wireless transmissions containing the program code.

The different components discussed for the data processing system associated with controlling an embodiment of the novel process and machine for flap actuation as shown at least in FIGS. 2-8B and 10 are not meant to provide architectural limitations to the manner in which different embodiments may be implemented.

As one example, a storage device in the data processing system may be any hardware apparatus that may store data. Memory, persistent storage and computer readable media are examples of storage devices in a tangible form.

In another example, a bus system may be used to implement communications fabric and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be a cache such as found in an interface and memory controller hub that may be present in the communications fabric.

Accordingly, when flap 200 is a part of or in communication with a fly-by-wire flight control system, commands sent to an embodiment of the novel process and machine for flap actuation as shown at least in FIGS. 2-8B and 10 may be scheduled in response to commands input to not only flap 200, but to other flight controls as well on aircraft 100. Additionally, commands sent to an embodiment of the novel process and machine for flap actuation as shown at least in FIGS. 2-8B and 10 may be scheduled in response to current positions of each flight control surface of aircraft 100.

Further, operations performed by an embodiment shown by process 1200 may include basing a size, of flap 200 for the particular aircraft model, before manufacturing begins, on a smallest and/or lightest size needed for reducing a takeoff and/or landing airspeed, and/or increasing a takeoff and/or landing payload, for aircraft 100. Additionally, the process and machine described above provide the technical effect of supplementing a total lift produced by wing 246 to a degree that may also allow for a reduction in a thickness and/or profile drag of wing 246.

Figure 13:
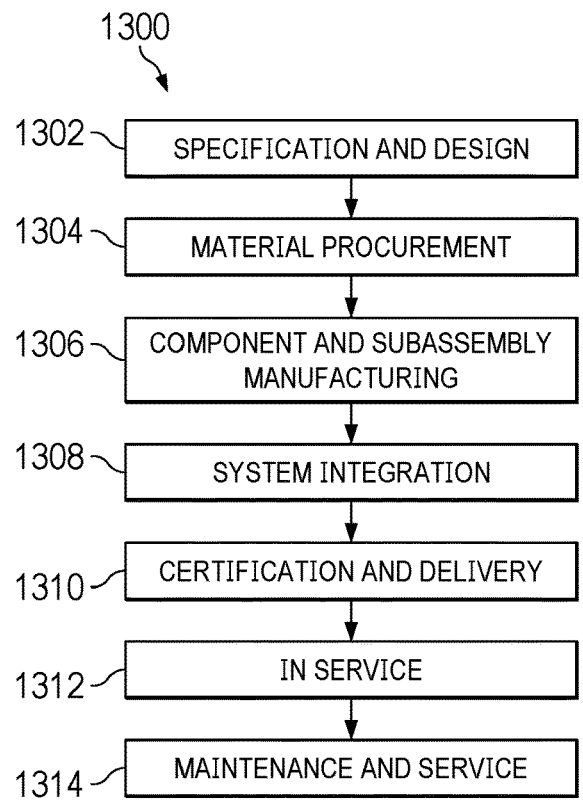
FIG. 13 is an illustration of a diagram illustrating operations of an embodiment for an aircraft manufacturing and service method, depicted in accordance with an advantageous embodiment.

Embodiments of the disclosure may be described in the context of aircraft manufacturing and service operations 1300 as shown in FIG. 13 for aircraft 100 as shown in FIG. 1 and an embodiment of the novel process and machine for flap actuation as shown at least in FIGS. 2-8B and 10. FIG. 13 shows a diagram illustrating operations of an embodiment for an aircraft manufacturing and service method, depicted in accordance with an advantageous embodiment. During pre-production, operations for aircraft manufacturing and service operations 1300 may include specification and design 1302 of aircraft 100 in FIG. 1 and an embodiment of the novel process and machine for flap actuation as shown at least in FIGS. 2-8B and 10 and material procurement 1304 therefor.

During production, component and subassembly manufacturing 1306 and system integration 1308 of aircraft 100 in FIG. 1 and an embodiment of the novel process and machine for flap actuation as shown at least in FIGS. 2-8B and 10 takes place. Thereafter, aircraft 100 in FIG. 1 and an embodiment of the novel process and machine for flap actuation as shown at least in FIGS. 2-8B and 10 may go through certification and delivery 1310 in order to be placed in service 1312. While in service by a customer, aircraft 100 in FIG. 1 and an embodiment of the novel process and machine for flap actuation as shown at least in FIGS. 2-8B and 10 may be scheduled for routine maintenance and service 1314, which may include modification, reconfiguration, refurbishment, and other maintenance or service.

Each of the processes of aircraft manufacturing and service operations 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and without limitation an operator may be an airline, leasing company, military entity, service organization, and so on.

Machines and processes embodied herein may be employed during any one or more of the stages of aircraft manufacturing and service method 1300 in FIG. 13. For example, components or subassemblies produced in component and subassembly manufacturing 1306 in FIG. 13 may be fabricated or manufactured in a manner similar to components or subassemblies produced while aircraft 100 is in service 1312 in FIG. 13.

Also, one or more apparatus embodiments, method embodiments, or a combination thereof may be utilized during production stages, such as component and subassembly manufacturing 1306 and system integration 1308 in FIG. 13, for example, without limitation, by substantially expediting the assembly of or reducing the cost of aircraft 100. Similarly, one or more of apparatus embodiments, method embodiments, or a combination thereof may be utilized while aircraft 100 and an embodiment of the novel process and machine for flap actuation as shown at least in FIGS. 2-8B and 10 is in service 1312 or during maintenance and service 1314 in FIG. 13.

Additionally, the illustrative embodiments recognize and take into account one or more different considerations. For example, the illustrative embodiments recognize and take into account that the use of buses, such as those used in computers, is becoming more common in aircraft. For example, special flight control programs in a computer processor may send commands to a special actuator control program in a processor that controls a device in the aircraft. An actuator control program may control, for example, a flight control surface, an engine, or some other suitable device in the aircraft that may affect a change in pitch attitude or rate of an aircraft.

The illustrative embodiments also recognize and take into account that a bus may be a parallel bus or a serial bus. When a parallel bus is used, units of data, such as a word, may be carried on multiple paths in the bus. Thus, the illustrative embodiments provide a method and apparatus for controlling flight control surfaces on an aircraft.

A flight control system may contain a data bus system, an actuator control, and individual mixers in communication with each actuator. The data bus system is located in aircraft 100, and may be a part of flight control computer 112.

The actuator control modules are connected to the data bus system. An actuator control in the actuator may control positioning of a group of flight control surfaces on aircraft 100 using commands via the data bus system that are directed to the actuator. Flight control programs and/or schedules may be connected to the data bus system. The flight control programs may generate and send the commands onto the bus system to control the flight control surfaces on the aircraft. The commands for a flight control surface may be directed towards a group of actuator control programs on processors assigned to the actuators of the flight control surfaces.

Flight control surfaces such as wing 246 and/or flap 200 may be controlled by controllers which may be implemented in software, hardware, firmware or a combination thereof. When software is used, the operations performed by actuator controllers may be implemented in program code configured to run on hardware, such as a processor unit. When firmware is used, the operations performed by actuator control programs and/or flight control programs, which may be implemented in program code and data and stored in persistent memory to run on a processor unit. When hardware is employed, the hardware may include circuits that operate to perform the operations in actuator control programs and flight control programs.

In the illustrative examples, without limitation the hardware for the processor units may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices that may be used for processor units include, for example, a programmable logic array, a programmable array logic, a field programmable logic array, a field programmable gate array, and other suitable hardware devices.

Additionally, the processes may be implemented in organic components integrated with inorganic components and may be comprised entirely of organic components excluding a human being. For example, the processes may be implemented as circuits in organic semiconductors.

As depicted, each of flight control programs may part of processor units that are dissimilar to each other and each of actuator control program may include processor units that are dissimilar to each other. For example, one processor unit in the module may be implemented using a computer microprocessor while the other processor in the module may be implemented using a digital signal processor. As another example, two computer microprocessors may be used having different processor architectures.

The illustrations are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a portion of a flight control system may use conventional controls in addition to a fly-by-wire system. Further, flight control computer 112 may control other types of devices other than flight control surfaces shown in the figure. For example, flight control computer 112 also may control engines on aircraft 100.

As yet another example, a network may be used in addition to or in place of data bus system to provide communications between actuator control programs and/or flight control programs. Further, some number of flight control sub-programs may be used as supplements to the systems and programs described herein for some illustrative examples. The operations illustrated in FIG. 12-13 may be implemented in aircraft 100 described in FIG. 1 and an embodiment of the novel process and machine for flap actuation as shown at least in FIGS. 2-8B and 10.

Operations that receive a signal and/or a command from an input device may be from a flight control deck of aircraft 100. These signals may be analog signals, digital signals, some combination thereof, or signals transmitted mechanically via a cable, pulley, linkage, or similar device. These signals may be generated from flight controls such as a flight stick, rudder pedals, a throttle, or some other suitable type of control. Flight controls may be controls operated by a pilot, and/or by another operator and/or system within or data linked from outside aircraft 100. In other illustrative examples, the flight controls may be devices sending sensor data or other information needed in the flight control modules to provide automatic adjustments to the flight of aircraft without input from the pilots. Flight control devices may send the commands onto a data bus system that may be within or in communication wing 246 and/or and an embodiment of the novel process and machine for flap actuation as shown at least in FIGS. 2-8B and 10 for flight control operations.

Figure 14:
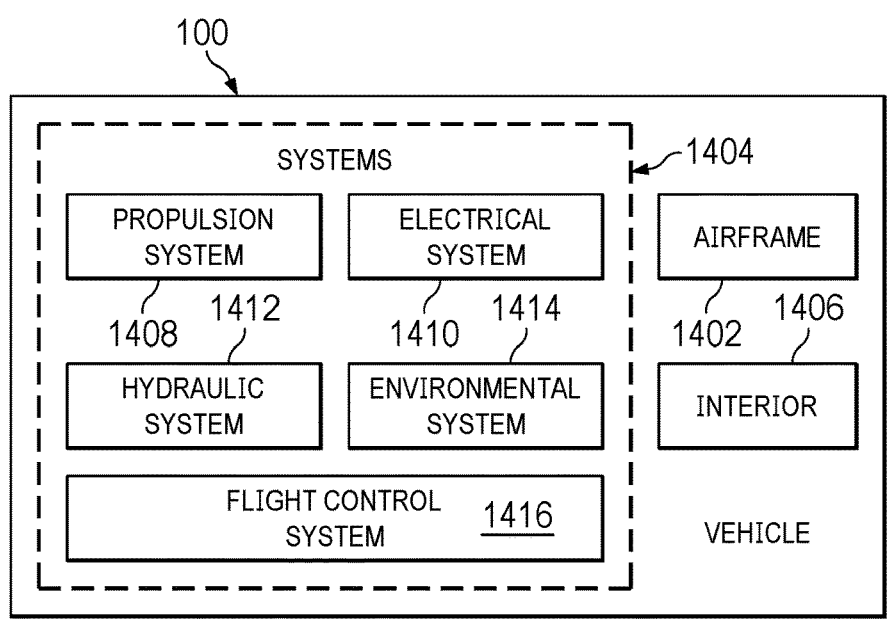
FIG. 14 is an illustration of an illustration of a vehicle, depicted in which an illustrative embodiment may be implemented in accordance with an advantageous embodiment.

With reference now to FIG. 14, an illustration of a vehicle is depicted in which an illustrative embodiment may be implemented. In this example, vehicle 100 may be without limitation, aircraft 100 as depicted in FIG. 1 and produced by vehicle manufacturing and service method 1300 in FIG. 13 and may include airframe 1402 with plurality of systems 1404 and interior 1406. Vehicle 100 is shown in FIG. 1 as an aircraft, but is also representative of a structural frame for any vehicle that moves through a fluid. Without limitation, vehicle 100 may be an aquatic vehicle or a vehicle that moves along terrain. Although flap 200 is shown in examples of vehicle 100 as an aircraft, it is understood that flap 200 may be any foil that extends into any fluid that flows over vehicle and may be positioned and/or deflected to control forces action upon and/or a motion of vehicle 100.

Examples of systems 1404 may include without limitation, one or more of propulsion system 1408, electrical system 1410, hydraulic system 1412, environmental system 1414, and flight control system 1416 that may include without limitation an embodiment of the machine for flap actuation as shown at least in FIGS. 2-8B and 10. Any number of other systems may be included. Although an aerospace example is shown, different illustrative embodiments may be applied to other industries, such as without limitation, the marine or automotive industry.

Apparatuses and methods embodied herein may be employed during at least one of the stages of vehicle manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while vehicle 100 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while vehicle 100 is in service 1312, or during maintenance and service 1314 in FIG. 13, or both. The use of a number of the different illustrative embodiments may expedite the assembly of vehicle 100, reduce the cost of vehicle 100, or both expedite the assembly of vehicle 100 and reduce the cost of vehicle 100 as shown in FIG. 14, FIG. 1, and related Figures above.

For example, an embodiment of the novel process and machine for flap actuation as shown at least in FIGS. 2-8B and 10 can be manufactured and integrated during at least one of component and subassembly manufacturing 1306, system integration 1308, or maintenance and service 1314. For example, an embodiment of the novel process and machine for flap actuation as shown at least in FIGS. 2-8B and 10 can be implemented during the manufacturing of vehicle 100. In other illustrative examples, an embodiment of the novel process and machine for flap actuation as shown at least in FIGS. 2-8B and 10 can be implemented, retrofit, added, upgraded, or maintained during maintenance and service 1314, which can include modification, reconfiguration, refurbishment, and other maintenance or service for vehicle 100. One of ordinary skill in the art recognizes that, an embodiment of the novel process and machine for flap actuation as shown at least in FIGS. 2-8B and 10 may be retrofitted to upgrade some currently existing wing 902 that lacks an embodiment of the novel process and machine for flap actuation as shown at least in FIGS. 2-8B and 10.

Some features of the illustrative examples are described in the following clauses. These clauses are examples of features not intended to limit other illustrative examples.

Clause 1. A machine that comprises:
a foil that comprises an upper surface, a lower surface, a leading edge, a trailing edge, an inboard edge, an outboard edge, and a track housing within the foil, wherein the track housing is defined by:
the upper surface;
the lower surface; and
an opening at the leading edge that extends, toward the trailing edge, between the upper surface and the lower surface and terminates before the trailing edge in an exit hole in the lower surface;
two track housing lugs that extend out from the opening and beyond the leading edge;
a foil clevis that extends below the lower surface;

a track that comprises a forward end, and aft end, and a curved shape configured to support the foil and to guide a movement of the foil;
an anchor plate that comprises: a track lug, two strut lugs, and an anchor clevis that all extend from a foil side of the anchor plate; and
an actuator connected to the foil clevis and to the anchor clevis.

Clause 2. The machine of clause 1, wherein:
the upper surface and the lower surface comprise a shape configured to control a flow of a fluid passing over the foil; and
with the actuator in a fully retracted position, a section of the track extends out the exit hole and below the lower surface.

Clause 3. The machine of clause 1, wherein the foil clevis extends, just outboard of an outboard side of the track housing, below the lower surface.

Clause 4. The machine of clause 1, wherein an inboard side within the track housing and an outboard side within the track housing each, respectively comprise a roller mounted on a cantilever.

Clause 5. The machine of clause 1, wherein an interior of the track housing comprises an inboard side and an outboard side, each that respectively comprise a roller configured to rotate within and support the track.

Clause 6. The machine of clause 1, wherein the track comprises a dual channel portion that comprises an inboard channel and an outboard channel, each respectively configured to receive, to support, and to guide, rollers connected to the track housing.

Clause 7. The machine of clause 1, wherein each of the two track housing lugs retain, respectively, a roller configured to engage with a dual channel portion of the track.

Clause 8. The machine of clause 1, wherein the track comprises a bracket portion and a dual channel portion.

Clause 9. The machine of clause 1, wherein the track comprises a bracket portion that comprises:
a track clevis at the forward end of the track; and
a set of strut pins.

Clause 10. The machine of clause 1, further comprising a strut that comprises:
an anchor end and a track end;
a first strut clevis at the track end of the strut and attached to a set of strut pins of the track; and
a second strut clevis at the anchor end of the strut.

Clause 11. The machine of clause 1, wherein the upper surface comprises a slot that extends from the opening, above the track housing, and toward the trailing edge.

Clause 12. The machine of clause 1, wherein:
the anchor plate comprises a spar side configured to attach to a wing; and
the curved shape of the track is configured to initially guide a movement of the foil away from the anchor plate parallel to a chord line of the wing to which the anchor plate is attached.

Clause 13. The machine of clause 1, further comprising a pylon that comprises:
a length that extends, with the actuator in a fully retracted position, from a spar side of the anchor plate to beyond the trailing edge of the foil; and
a depth that encloses a section of the track that extends, with the actuator in a fully retracted position, out the exit hole and beneath the lower surface.

Clause 14. A flap system that comprises:
a foil that comprises an upper surface, a lower surface, a leading edge, a trailing edge, an inboard edge, an outboard edge, and a track housing within the foil, wherein the track housing is defined by:
the upper surface;
the lower surface; and
an opening at the leading edge that extends, toward the trailing edge, between the upper surface and the lower surface and terminates before the trailing edge in an exit hole in the lower surface;
two track housing lugs that extend out from the opening and beyond the leading edge;
a foil clevis that extends below the lower surface;
a track that comprises a forward end, an aft end, and a curved shape configured to:
support the foil; and
guide a movement of the foil;
an anchor plate that comprises a track lug, two strut lugs, and an anchor clevis that all extend from a foil side of the anchor plate;
an actuator connected to the foil clevis and to the anchor clevis; and
a pylon that comprises:
a length that extends, with the actuator in a fully retracted position, from a spar side of the anchor plate to beyond the trailing edge of the foil; and
a depth that encloses a section of track that extends, with the actuator in a fully retracted position, out the exit hole and beneath the lower surface.

Clause 15. The flap system of clause 14, further comprising a strut connected to:
the two strut lugs; and
two pins that extend from a bracket portion of the track.

Clause 16. The flap system of clause 14, wherein a width between the upper surface and the lower surface is less than a thickness of a trailing edge of a wing to which the anchor plate is configured to attach.

Clause 17. The flap system of clause 16, wherein the wing is configured for transonic flight.

Clause 18. The flap system of clause 14, wherein:
the anchor plate is configured to attach to a wing; and
the curved shape of the track is configured to initially guide a movement of the foil away from the anchor plate parallel to a chord line of the wing to which the anchor plate is attached.

Clause 19. The flap system of clause 14, each of the track housing lugs retain a roller, respectively, configured to rotate within a track channel of the track.

Clause 20. A process for forming a flap system, the process comprising:
forming a track housing within a flap system that comprises:
a foil that comprises an upper surface, a lower surface, a leading edge, a trailing edge, an inboard edge, an outboard edge, and the track housing within the foil, wherein the track housing is defined by:
the upper surface;
the lower surface;
an opening at the leading edge that extends, toward the trailing edge, between the upper surface and the lower surface and terminates before the trailing edge in an exit hole in the lower surface;
two track housing lugs that extend out from the opening and beyond the leading edge;
a foil clevis that extends below the lower surface;

a track that comprises a bracket portion that comprises a forward end, a dual channel portion that comprises an aft end, and a curved shape configured to:
support the foil; and
guide a movement of the foil;
an anchor plate that comprises a track lug, two strut lugs, and an anchor clevis that all extend from a foil side of the anchor plate;
an actuator configured to connect to the foil clevis and to the anchor clevis, and to extend and retract the foil; and
a pylon that comprises:
a length that extends, with the actuator in a fully retracted position, from a spar side of the anchor plate to beyond the trailing edge of the foil; and a depth that encloses a section of the
dual channel portion of the track that extends, with the actuator in a fully retracted position, out the exit hole and beneath the lower surface;
attaching the foil to a wing by attaching the anchor plate to the wing, attaching the forward end of the track to the track lug, attaching a strut to the two strut lugs and to the bracket portion of the track, and attaching the actuator to the anchor clevis and to the foil clevis; and
covering, with the pylon, the actuator, the foil clevis, and the section of the dual channel portion of the track that extends, with the actuator in a fully retracted position, out the exit hole and beneath the lower surface.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for managing commands for flight control surfaces. One or more illustrative embodiments may use fly-by-wire systems for aircraft. The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A machine that comprises:
a foil that comprises an upper surface, a lower surface, a leading edge, a trailing edge, an inboard edge, an outboard edge, and a track housing within the foil, wherein the track housing is defined by:
the upper surface;
the lower surface; and
an opening at the leading edge that terminates before the trailing edge in an exit hole in the lower surface;
a track housing lug;
a foil clevis that extends below the lower surface;
a track that comprises:
a forward end;
an aft end;
a curved shape; and
a bracket portion that comprises:
a track clevis at the forward end of the track; and
a set of strut pins;
an anchor plate that comprises lugs that extend from a foil side of the anchor plate; and
an actuator connected to the foil clevis and to an anchor clevis.

2. The machine of claim 1, wherein:
the upper surface and the lower surface comprise a shape configured to control a flow of a fluid passing over the foil; and
with the actuator in a fully retracted position, a section of the track extends out the exit hole and below the lower surface.

3. The machine of claim 1, wherein the foil clevis extends, just inboard of an inboard side of the track housing, below the lower surface.

4. The machine of claim 1, wherein an inboard side within the track housing and an outboard side within the track housing each, respectively comprise a roller mounted on a cantilever.

5. The machine of claim 1, wherein an interior of the track housing comprises an inboard side and an outboard side, each that respectively comprise a roller configured to rotate within and support the track.

6. The machine of claim 1, wherein the track comprises a dual channel portion that comprises an inboard channel and an outboard channel, each respectively configured to receive, to support, and to guide, rollers connected to the track housing.

7. The machine of claim 1, wherein each of the track housing lug retains, respectively, a roller configured to engage with a dual channel portion of the track.

8. The machine of claim 1, wherein the track comprises a bracket portion and a dual channel portion.

9. The machine of claim 1, further comprising a strut that comprises:
an anchor end and a track; and
a first strut clevis at the track end of the strut and attached to the set of strut pins of the track.

10. The machine of claim 9, further comprising a second strut clevis at the anchor end of the strut.

11. The machine of claim 1, wherein the upper surface comprises a slot that extends from the opening, above the track housing, and toward the trailing edge.

12. The machine of claim 1, wherein:
the anchor plate comprises a spar side configured to attach to a wing; and the curved shape of the track is configured to initially guide a movement of the foil away from the anchor plate parallel to a chord line of the wing to which the anchor plate is attached.

13. The machine of claim 1, further comprising a pylon that comprises:
   a length that extends, with the actuator in a fully retracted position, from a spar side of the anchor plate to beyond the trailing edge of the foil; and
   a depth that encloses a section of the track that extends, with the actuator in a fully retracted position, out the exit hole and beneath the lower surface.

14. A flap system that comprises:
   a foil that comprises an upper surface, a lower surface, a leading edge, a trailing edge, an inboard edge, an outboard edge, and a track housing within the foil, wherein the track housing is defined by:
      the upper surface;
      the lower surface; and
      an opening at the leading edge that extends, toward the trailing edge and terminates before the trailing edge in an exit hole in the lower surface;
   a track housing lug that extends out from the opening and beyond the leading edge;
   a foil clevis that extends below the lower surface;
   a track that comprises a forward end, an aft end, and a curved shape;
   an anchor plate that comprises a track lug, a strut lug, and an anchor clevis, wherein a width between the upper surface and the lower surface is less than a thickness of a trailing edge of a wing to which the anchor plate is configured to attach;
   an actuator connected to the foil clevis and to the anchor clevis; and
   a pylon.

15. The flap system of claim 14, further comprising a strut connected to:
   the strut lug on the anchor plate; and two pins that extend from a bracket portion of the track.

16. The flap system of claim 14, wherein the anchor plate is configured to attach to the wing to which the anchor plate is configured to attach.

17. The flap system of claim 16, wherein the wing is configured for transonic flight.

18. The flap system of claim 16, wherein the curved shape of the track is configured to initially guide a movement of the foil away from the anchor plate parallel to a chord line of the wing to which the anchor plate is attached.

19. The flap system of claim 14, the track housing lug retains a roller configured to rotate within a track channel of the track.

20. A process for forming a flap system, the process comprising:
   forming a track housing within a flap system that comprises:
      a foil that comprises an upper surface, a lower surface, a leading edge, a trailing edge, an inboard edge, an outboard edge, and the track housing within the foil, wherein the track housing is defined by:
         the upper surface;
         the lower surface;
         an opening at the leading edge that extends, toward the trailing edge and terminates before the trailing edge in an exit hole in the lower surface;
      a track housing lug that extends out from the opening and beyond the leading edge;
      a foil clevis that extends below the lower surface;
      a track that comprises a bracket portion that comprises a forward end, a dual channel portion that comprises an aft end, and a curved shape configured to:
         support the foil; and
         guide a movement of the foil;
      an anchor plate that comprises a track lug, a strut lug, and an anchor clevis that all extend from a foil side of the anchor plate, wherein a width between the upper surface and the lower surface is less than a thickness of a trailing edge of a wing to which the anchor plate is configured to attach;
      an actuator configured to:
         connect to the foil clevis and to the anchor clevis; and
         extend and retract the foil; and
      a pylon that comprises:
         a length that extends, with the actuator in a fully retracted position, from a spar side of the anchor plate to beyond the trailing edge of the foil; and
         a depth that encloses a section of the dual channel portion of the track that extends, with the actuator in a fully retracted position, out the exit hole and beneath the lower surface;
   attaching the foil to the wing by: attaching the anchor plate to the wing, attaching the forward end of the track to the track lug, attaching a strut to the two strut lugs and to the bracket portion of the track, and attaching the actuator to the anchor clevis and to the foil clevis; and
   covering, with the pylon, the actuator, the foil clevis, and the section of the dual channel portion of the track that extends, with the actuator in a fully retracted position, out the exit hole and beneath the lower surface.

* * * * *

UNITED STATES PATENT AND TRADEMARK OFFICE
CERTIFICATE OF CORRECTION

PATENT NO. : 12,252,238 B2  
APPLICATION NO. : 18/177310  
DATED : March 18, 2025  
INVENTOR(S) : Kevin Raylin Tsai Page 1 of 1

It is certified that error appears in the above-identified patent and that said Letters Patent is hereby corrected as shown below:

In the Claims

Column 29, Line 49, Claim 19, correct "14, the track" to read -- 14, wherein the track --  
Column 30, Line 44, Claim 20, correct "the two strut lugs" to read -- the anchor plate --

Signed and Sealed this  
Fifteenth Day of April, 2025

Coke Morgan Stewart  
*Acting Director of the United States Patent and Trademark Office*